United States Patent
Khoryaev et al.

(10) Patent No.: US 11,317,415 B2
(45) Date of Patent: Apr. 26, 2022

(54) SELECTING RESOURCES FOR SIDELINK COMMUNICATION BASED ON GEO-LOCATION INFORMATION

(71) Applicant: Apple Inc., Cupertino, CA (US)

(72) Inventors: Alexey Khoryaev, Nizhny Novgorod (RU); Alexander Sirotkin, Petach Tikva (IL); Sergey Panteleev, Nizhny Novgorod (RU); Sergey D. Sosnin, Zavolzhie (RU); Dmitry Belov, Nizhny Novgorod (RU); Pavel Dyakov, Nizhny Novgorod (RU); Mikhail S. Shilov, Nizhny Novgorod (RU); Andrey Chervyakov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/639,660

(22) PCT Filed: Aug. 17, 2018

(86) PCT No.: PCT/US2018/046862
§ 371 (c)(1),
(2) Date: Feb. 17, 2020

(87) PCT Pub. No.: WO2019/036578
PCT Pub. Date: Feb. 21, 2019

(65) Prior Publication Data
US 2022/0039080 A1    Feb. 3, 2022

Related U.S. Application Data

(60) Provisional application No. 62/551,017, filed on Aug. 28, 2017, provisional application No. 62/456,941, filed on Aug. 17, 2017.

(51) Int. Cl.
*H04W 72/04* (2009.01)
*H04W 4/40* (2018.01)
(Continued)

(52) U.S. Cl.
CPC .......... *H04W 72/048* (2013.01); *G01S 19/46* (2013.01); *H04L 5/0048* (2013.01); *H04W 4/40* (2018.02); *H04W 72/0406* (2013.01)

(58) Field of Classification Search
CPC ....... G01S 16/46; H04L 5/0048–0051; H04W 4/023; H04W 4/025; H04W 4/40–48;
(Continued)

(56) References Cited

U.S. PATENT DOCUMENTS

| 2004/0242274 A1* | 12/2004 | Corbett | .................. H01Q 1/242 455/562.1 |
| 2015/0195828 A1* | 7/2015 | Fujishiro | ............... H04W 48/16 370/329 |

(Continued)

FOREIGN PATENT DOCUMENTS

| CN | 107734462 A | * | 2/2018 | ............. H04B 7/024 |
| CN | 104904289 B | * | 5/2019 | .......... H04W 52/383 |

(Continued)

OTHER PUBLICATIONS

International Search Report dated Nov. 14, 2018 for International Application No. PCT/US2018/046862.
(Continued)

*Primary Examiner* — Thomas R Cairns
(74) *Attorney, Agent, or Firm* — Eschweiler & Potashnik, LLC

(57) ABSTRACT

A user equipment (UE) or network device such as a Vehicle-to-Everything (V2X) node, or V2X device operates to configure sidelink signals with another vehicle or node with resources that can be used for ranging and sidelink communications within a Long Term Evolution (LTE) network or a New Radio (NR) network. The UE/device generate or process a broadcast communication of the sidelink signal via an adaptive antenna array or a directional antenna array and
(Continued)

forming a directional radiation pattern from a beam sweeping operation based on geo-location information determined based on a sidelink signal. Depending on the geo-location information coordinates or the position of other vehicles or nodes can be derived to select or configure resources for a sidelink communication, including a Sidelink Ranging Reference Signal (SR-RS) and associated sidelink communication data.

27 Claims, 26 Drawing Sheets

(51) Int. Cl.
*G01S 19/46* (2010.01)
*H04L 5/00* (2006.01)

(58) Field of Classification Search
CPC ... H04W 8/022; H04W 8/20; H04W 36/0072; H04W 72/02; H04W 72/0406; H04W 72/046; H04W 72/048
See application file for complete search history.

(56) References Cited

U.S. PATENT DOCUMENTS

| | | |
|---|---|---|
| 2016/0174122 A1 | 6/2016 | Sorrentino |
| 2016/0183044 A1* | 6/2016 | Wei ................... H04W 64/003 |
| | | 455/456.1 |
| 2016/0295624 A1 | 10/2016 | Novlan et al. |
| 2016/0330728 A1 | 11/2016 | Sorrentino |
| 2017/0150330 A1 | 5/2017 | Kim et al. |
| 2018/0048442 A1* | 2/2018 | Sang ..................... H04B 7/088 |
| 2019/0045469 A1 | 2/2019 | Zhang |
| 2020/0163043 A1* | 5/2020 | Schmidt ............. H04W 56/001 |

FOREIGN PATENT DOCUMENTS

| | | |
|---|---|---|
| WO | 2017/136001 A1 | 8/2017 |
| WO | 2017171519 A1 | 10/2017 |

OTHER PUBLICATIONS

International Preliminary Report on Patentability dated Feb. 18, 2020 for International Application No. PCT/US2018/046862.

* cited by examiner

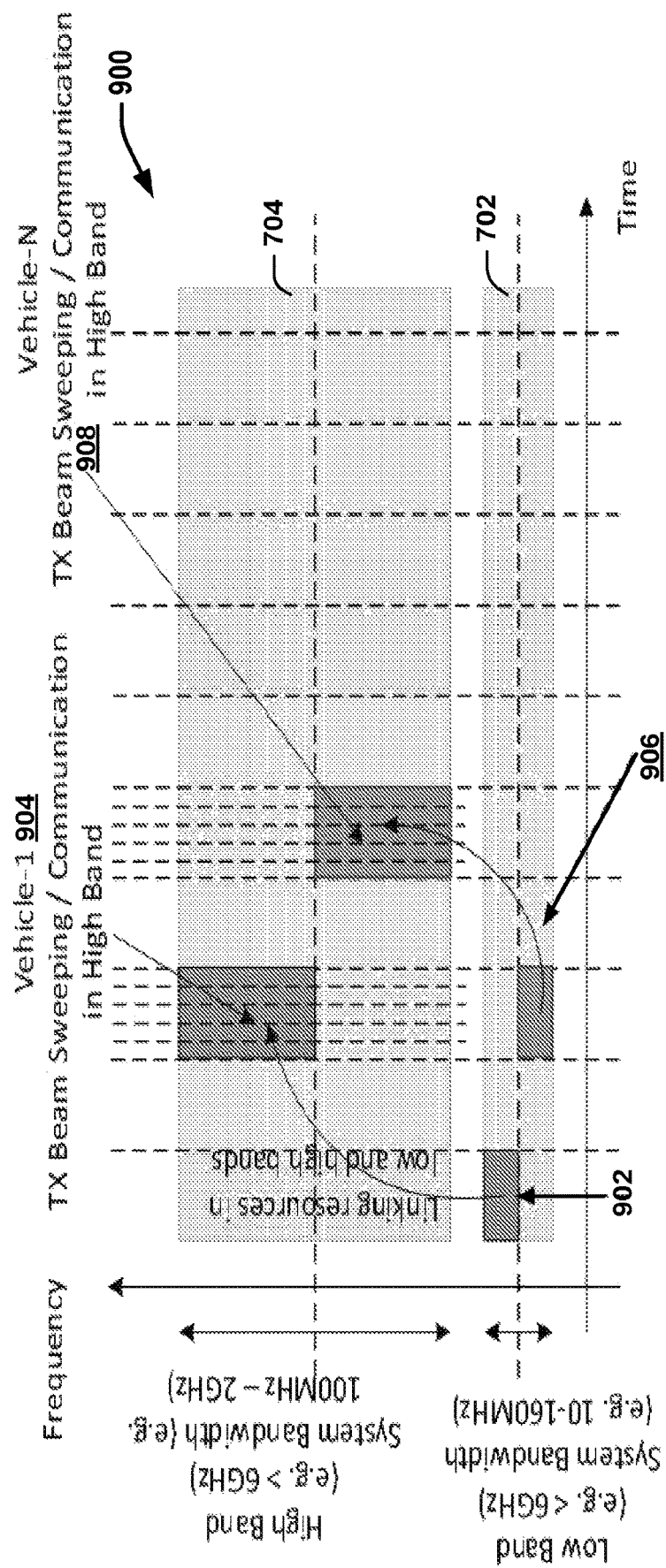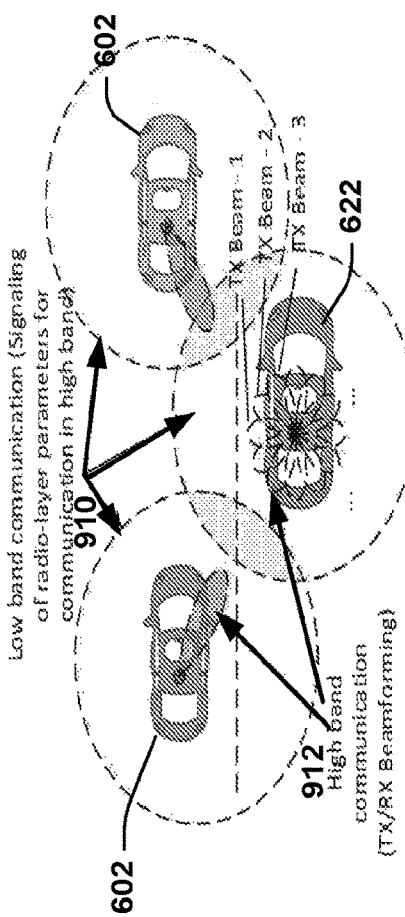
FIG. 9

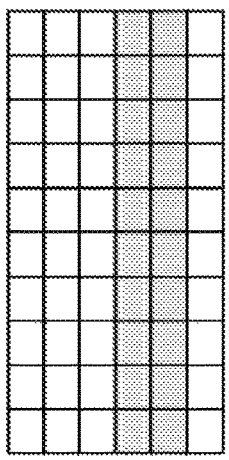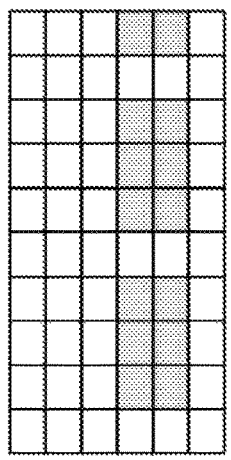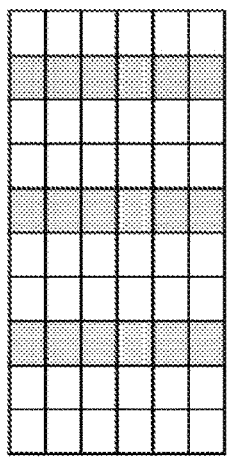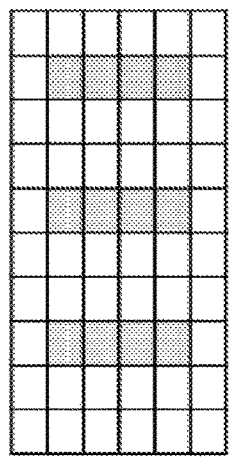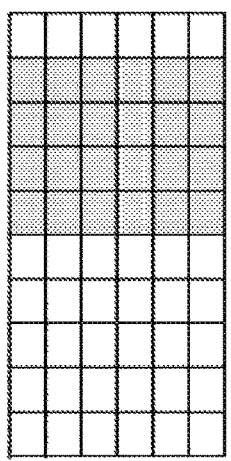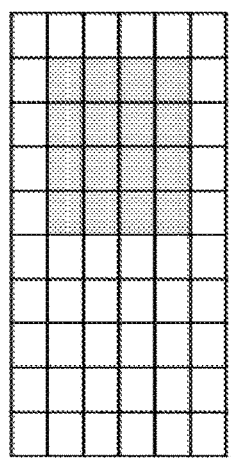
FIG. 21

SELECTING RESOURCES FOR SIDELINK COMMUNICATION BASED ON GEO-LOCATION INFORMATION

REFERENCE TO RELATED APPLICATIONS

This application is a National Phase entry application of International Patent Application No. PCT/US2018/046862 filed Aug. 17, 2018, which claims priority to U.S. Provisional Application No. 62/546,941 filed Aug. 17, 2017, entitled "PHYSICAL SIGNAL STRUCTURE FOR SIDELINK RANGING AND POSITIONING IN LTE AND NR TECHNOLOGIES", and the benefit of U.S. Provisional Application No. 62/551,017 filed Aug. 28, 2017, entitled "SIDELINK BROADCAST COMMUNICATION USING DIRECTIONAL ANTENNAS FOR INTER-VEHICULAR OR INTER-DRONE APPLICATIONS", and is hereby incorporated by reference in their its entirety.

FIELD

The present disclosure relates to wireless technology, and more specifically to techniques for sidelink communication via broadcast using directional antennas with a physical signal structure for sidelink ranging and positioning in a Long Term Evolution (LTE) network or a New Radio (NR) network.

BACKGROUND

Mobile communication, including cellular communication, involves the transfer of data between mobile devices. A type of mobile communication includes vehicle communication, where vehicles communicate or exchange vehicle related information. The vehicle communication can include vehicle to everything (V2X), which can include vehicle to vehicle (V2V), vehicle to infrastructure (V2I), and vehicle to pedestrian (V2P), or the like, in which each can include a user equipment (UE) or base station device such as a new radio NodeB (gNB), an eNodeB (eNB), or the like. A V2X node, for example, can comprises a new radio NodeB (gNB), an eNodeB (eNB), a user equipment (UE), a Roadside Unit (RSU), a drone, or other vehicle device when referred to herein. In some situations, vehicle related information is intended for a single vehicle or other entity. In other situations, such as emergency alerts, vehicle related information is intended for a large number of vehicles or other device entities. The emergency alerts can include collision warnings, control loss warnings, collision avoidance, pedestrian safety and other coordination to ensure safe and efficient traffic flows, especially in vehicle (e.g., auto, craft, drone, etc.) to vehicle communications.

Long Term Evolution (LTE) network or a New Radio (NR) cellular technologies are being developed to support direct communication among devices (e.g. vehicles, drones, wearables, etc.). Terminals can be equipped with omni and directional antennas or adaptive antenna arrays with spatial beamforming capabilities to operate in low (e.g. below 6 GHz) and high bands (above 6 GHz). In one example, communication in mmWave band requires large antenna arrays providing high beamforming gains. The beamforming gain should compensate significant propagation loss at high carrier frequencies and enable use of power amplifier with reduced TX power given that integrated power amplifiers with high output power is challenging to design using low cost CMOS technologies. Efficient communication using adaptive antenna arrays includes solving the problem of setting Tx/Rx antenna array states/weights (typically represented by phase shift at each antenna element). The communication link is described by a pair of TX/RX beams set at the TX and RX node, respectively. The proper setting of TX/RX beams can optimize channel propagation characteristic(s) for given communication link. If TX/RX beams are not selected properly then significant link budget loss can be expected. Accurately selected beams (e.g. beams directed towards each other) can provide significant beamforming gains and thus increase received signal power of unicast links.

Additionally, autonomous driving applications utilize a very high accuracy of vehicle location (longitude and latitude estimation errors <1 m) to enable autonomous control of vehicle. This objective can be challenging to achieve using Global Network Satellite Systems (GNSS) technologies only, especially in urban environments where signals from satellites are more likely to be blocked by buildings. Therefore, location determination technologies, including devices such as radar, Lidar, GNSS camera, or related sensors can be used in order to achieve accurate vehicle location and enable autonomous driving applications.

As such, there is a need to use wireless communication systems such as for example cellular 3GPP LTE and NR technologies to assist in accurate vehicle positioning. Both wireless technologies can be used to improve vehicle location utilizing inter-vehicle and vehicle-to-infrastructure communication and ranging protocols to determine or refine vehicle coordinates. In addition, suitable techniques to provide vehicle related information to multiple vehicles and/or other device entities such as V2X devices is needed for increased and ongoing safety and coordination in communications between different node entities or devices.

BRIEF DESCRIPTION OF THE DRAWINGS

FIG. 9 is a diagram illustrating an example of beam management based on the indication of geo-location information and transmission schedule over the air interface, according to various aspects discussed herein.

FIG. 21 is a diagram illustrating different allocation of SR-RS resource pool (separate from PSCCH/PSSCH pool), according to various aspects discussed herein.

DETAILED DESCRIPTION

Figure 1:
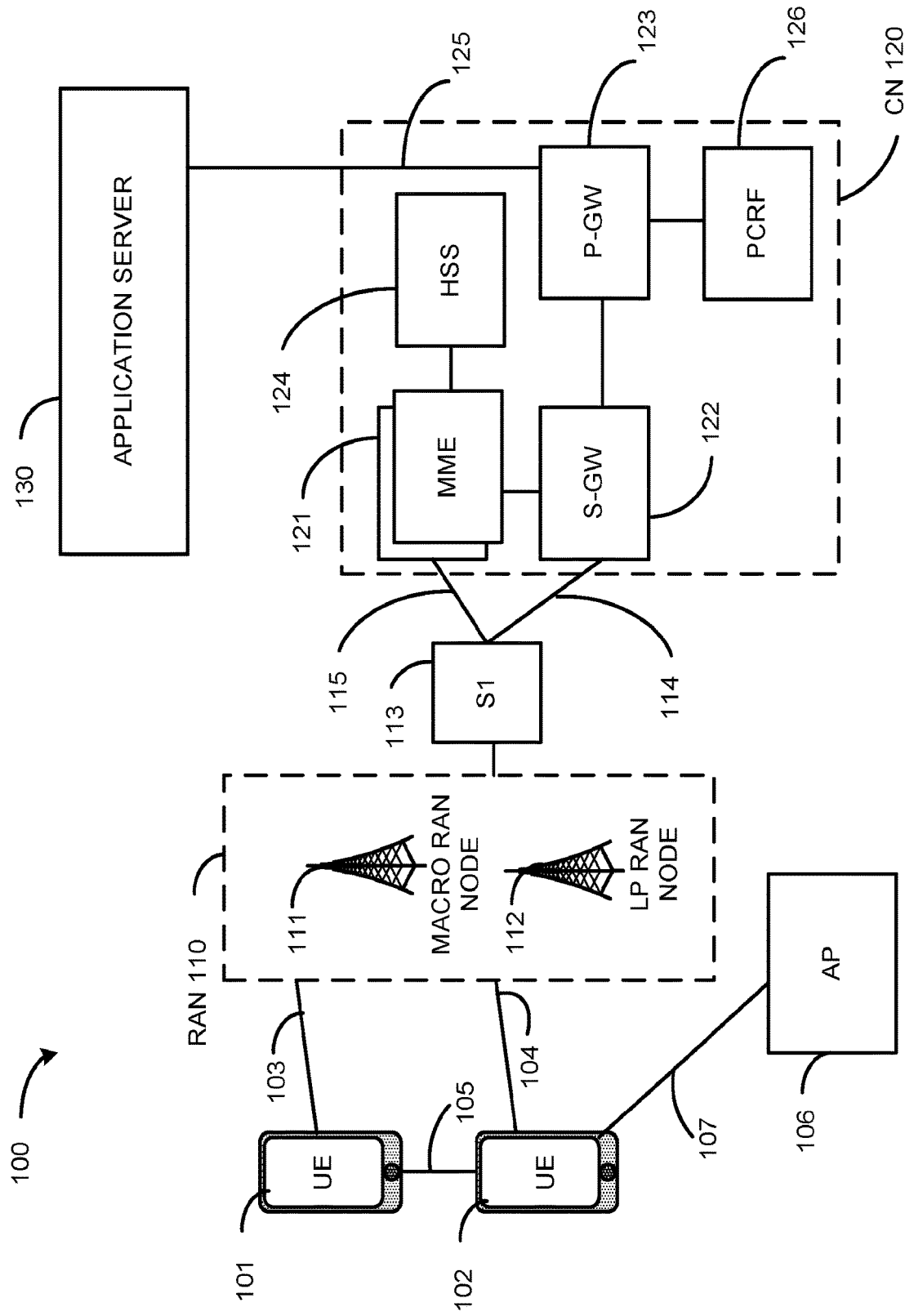
FIG. 1 is a block diagram illustrating an example user equipments (UEs) or Vehicle (V) or Vehicle-to-Everything (V2X) device in a network with network components useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In consideration of various deficiencies or solutions described herein, a V2X as a network node/device that comprises a New Radio (NR)/5G NodeB (gNB), an eNodeB (eNB), a user equipment (UE), a Roadside Unit (RSU), a drone, vehicle device, or other vehicle unit/component can generate, or process, a sidelink signal for a sidelink communication with another entity (other V2X node). The V2X (node/device) can be configured to determine geo-location information of another V2X node based on the sidelink signal between the V2X device and the V2X node, and derive a distance or distances for a sidelink ranging and a set of resources based on the geo-location information.

References herein to an eNB, gNB or network device also can be considered, or correlates to, a Roadside Unit (RU) or V2X node that networks vehicles for transportation, drones, smart clothing, or other mobile smart products related to transportation, especially autonomous transportation units or fleets, in addition to a base station. Likewise, a vehicle/drone/V2X device can also be referred to herein as a UE.

As referred to herein, ranging can include signaling to receive or determine geographical location (geo-location/positioning) information such as determining coordinates, a position, or a geographical location/movement/velocity/acceleration or other coordinate data associated with a receiver of another vehicle, node or target device (e.g., another vehicle or V2X node including any one of a UE, drone, vehicle, Internet of Things (IoT) device, or other component/device that can include multiple location technologies, such as radar, lidar, GNSS camera, or sensors that can be used in order to achieve accurate vehicle location and enable autonomous driving applications within LTE or NR networks to assist in accurate vehicle positioning. Ranging can thus be a geolocation (geo-locating) of a network device to determine with communication signaling to improve vehicle location utilizing inter-vehicle and vehicle-to-infrastructure communication as well as ranging protocols to determine or refine vehicle coordinates. Geolocation is the identification or estimation of the real-world geographic location of an object, such as a radar source, mobile phone, internet-connected computer terminal, network terminal or the like, which can involve the generation of geographic coordinates, similar to positioning/tracking systems, and also referred to herein as ranging or a ranging protocol.

Both LTE and NR technologies will enable positioning service (e.g. similar to the one realized through LTE Positioning Protocol—LPP), however this service may not be able to meet latency requirements, cannot be provided in out of coverage scenarios and its accuracy in urban environments is also far from vehicle location objectives. In out-of-coverage scenarios, a vehicle is expected to determine its location using GNSS and other sensor technologies to autonomously position itself on a road map. However, even using multiple technologies it is still challenging to meet location requirements (in the order of tens of cm) mandated by autonomous vehicle applications.

In order to further improve vehicle positioning accuracy, ranging/positioning protocols between vehicles, as well as between vehicles and road side units (RSU—infrastructure units) can be enabled. Vehicles and/or RSUs can measures signal location parameters as part of geo-location information such as phase difference(s), time of arrival(s), time difference(s) of arrival, propagation delay(s), angle of arrival(s) to extract information about inter-vehicle or vehicle-RSU distances/ranges. These additional measurements between vehicles/RSUs, can be used to improve the accuracy of location estimation obtained in-coverage or out-of-coverage network areas.

Additional aspects and details of the disclosure further described below with reference to figures.

Embodiments described herein can be implemented into a system using any suitably configured hardware and/or software. FIG. 1 illustrates an architecture of a system 100 of a network in accordance with some embodiments. The system 100 is illustrated to include a UE 101 and a UE 102, which can further represent V2X devices as discussed herein.

In some embodiments, any of the UEs 101 and 102 can comprise a vehicular/drone/Internet of Things (IoT) UE device or an IoT device, which can comprise a network access layer. These devices can also utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, communicatively couple, or operably couple with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, as well as vehicle network nodes including V2X nodes or the like. They can be referred to as RAN nodes herein and also comprise ground stations (e.g., terrestrial access points) or satellite stations providing coverage within a geographic area (e.g., a cell). The RAN 110 can thus include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It can also inform the UEs 101 and 102 about the transport format, resource allocation, and Hybrid Automatic Repeat Request (H-ARQ) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced the control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the EPC network 123 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
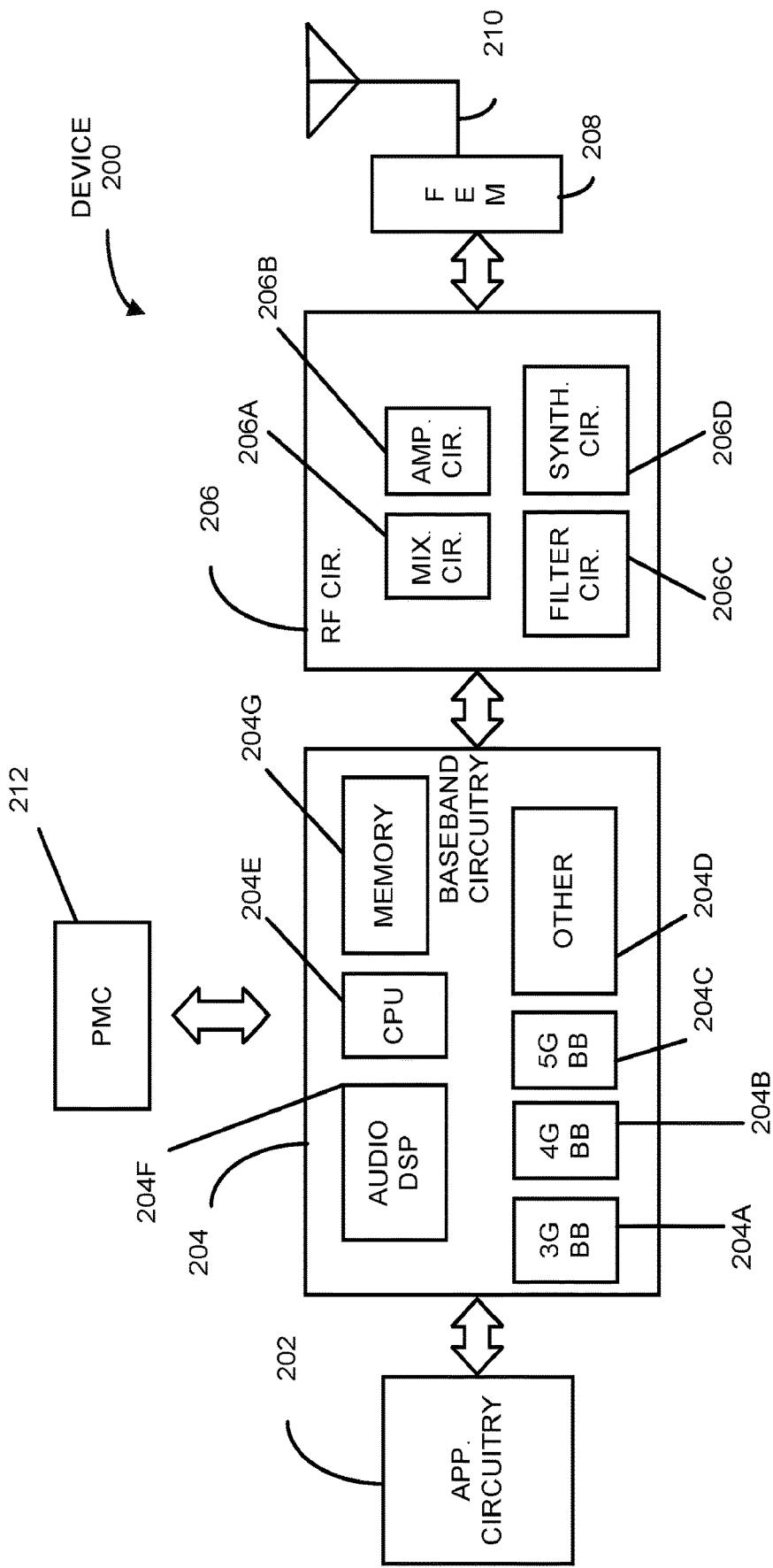
FIG. 2 is a diagram illustrating example components of a device that can be employed in accordance with various aspects discussed herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node, such as UE 101/102, or eNB/gNB 111/112. In some embodiments, the device 200 can include less elements (e.g., a RAN node can not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tailbiting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

Figure 4:
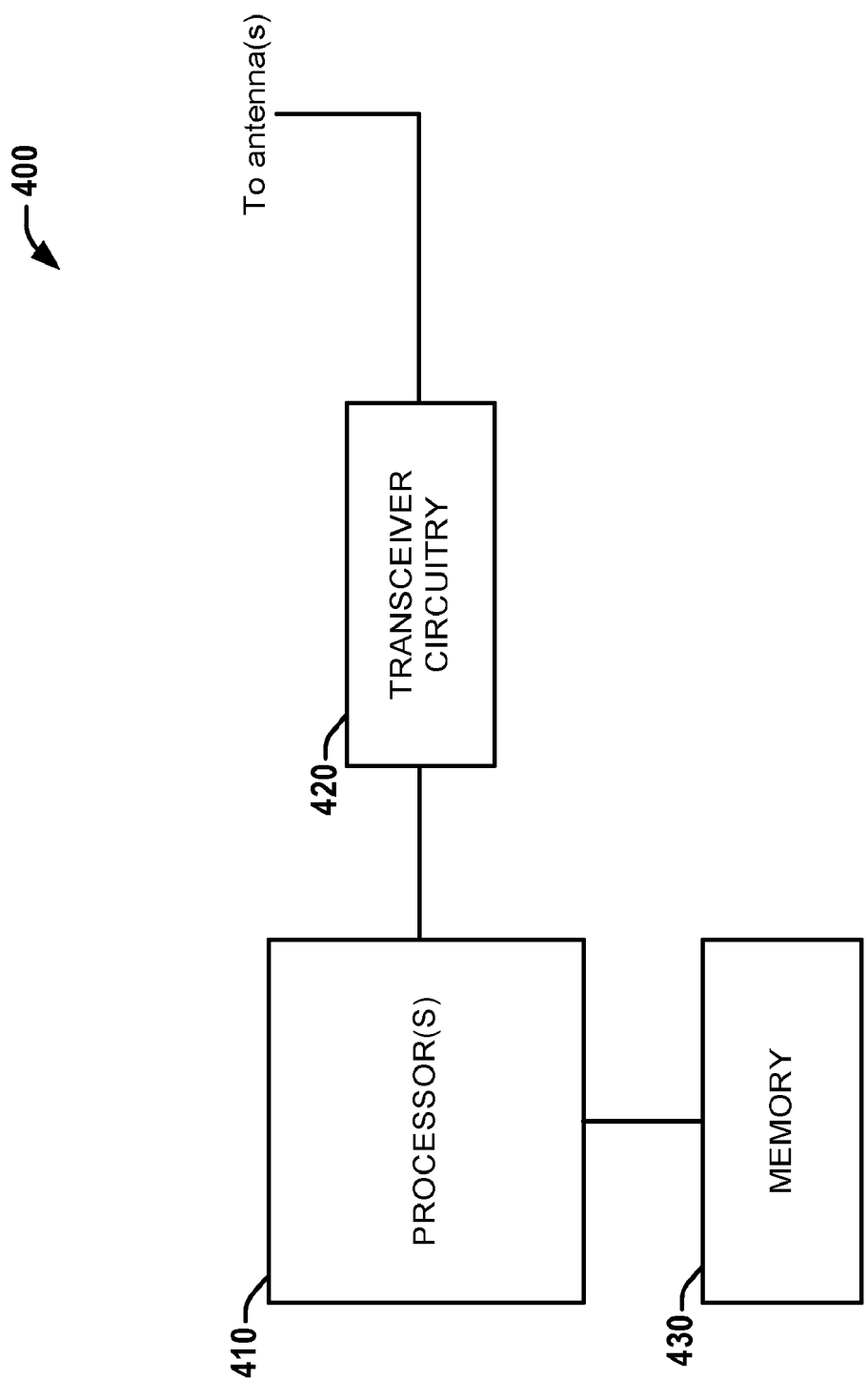
FIG. 4 is a block diagram illustrating a system employable at a UE that facilitates USS reconfiguration in connection with URLLC transmission, according to various aspects described herein.
Figure 5:
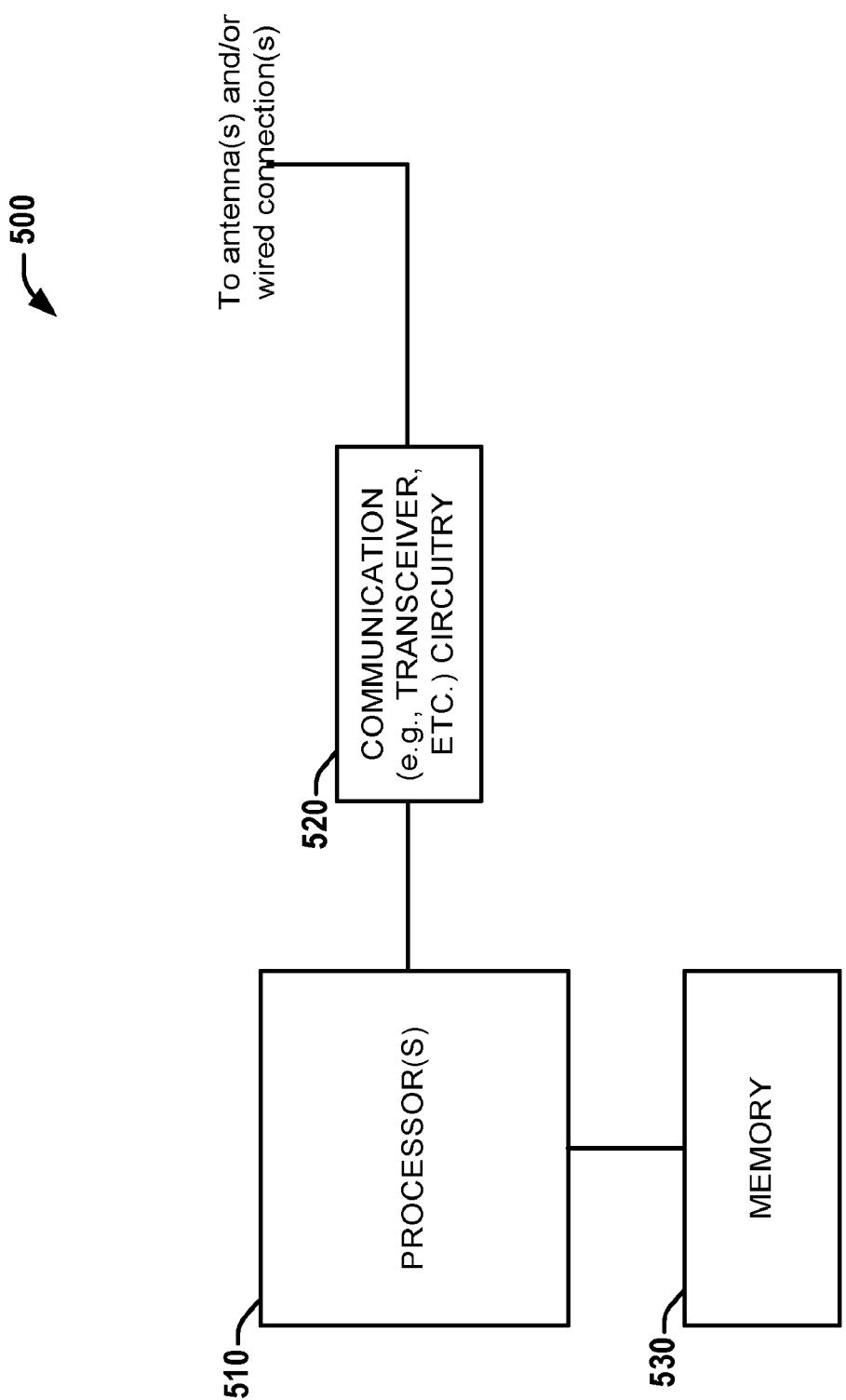
FIG. 5 is a block diagram illustrating a system employable at a BS (Base Station) that facilitates USS reconfiguration in connection with URLLC transmission from one or more UEs, according to various aspects described herein.

In addition, the memory 204G (as well as other memory components discussed herein, e.g., memory 430 of FIG. 4, memory 530 of FIG. 5 or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
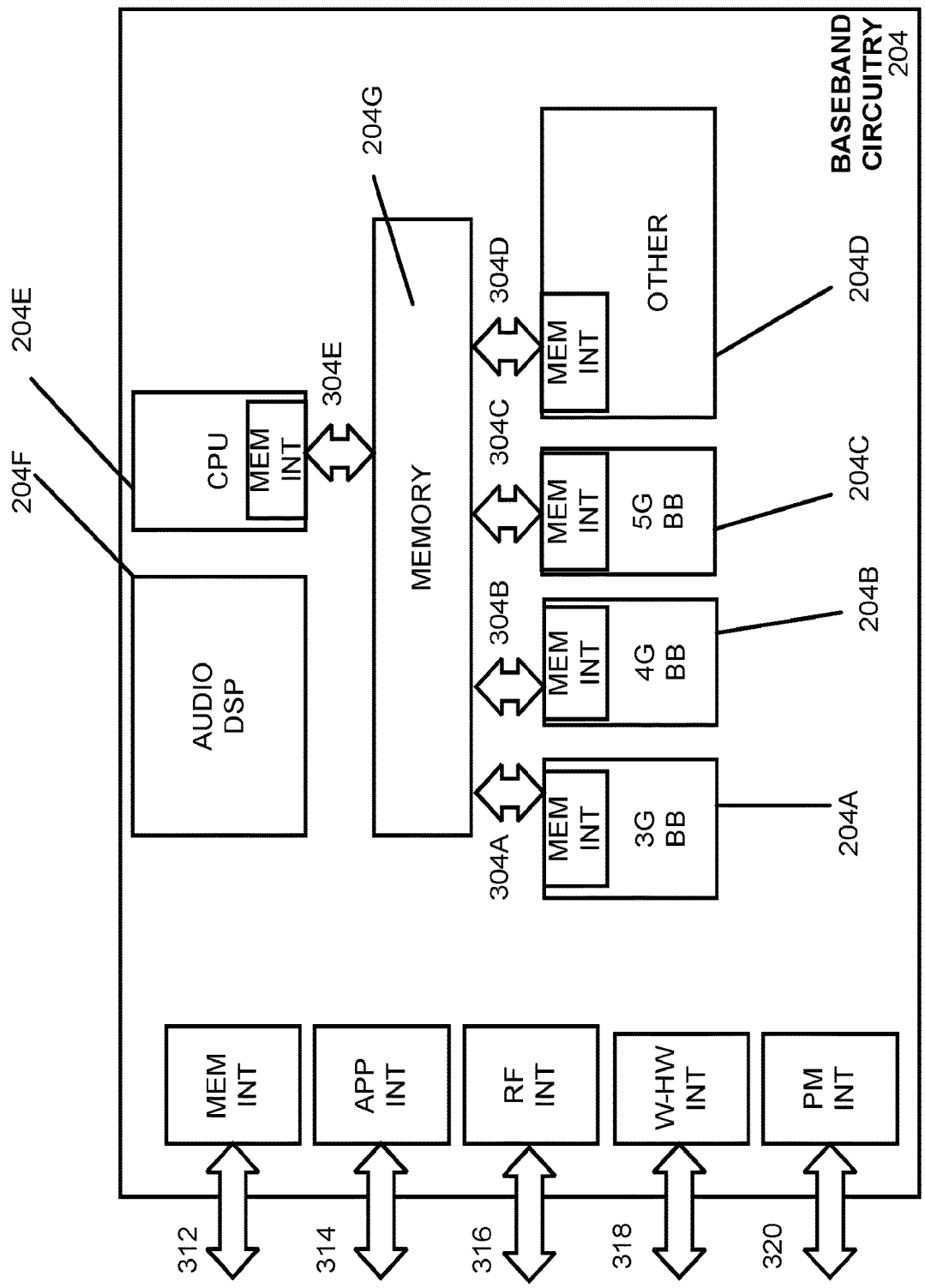
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Referring to FIG. 4, illustrated is a block diagram of a system/device 400 employable at a UE (or V2X) or other network device (e.g., UE 101/102) that facilitates dynamic or semi-static configuration to provide for resource selection based on partial sensing process(es) and UE behavior with respect to congestion control process(es) or the like according to various aspects described herein. System 400 can include one or more processors 410 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE). As described in greater detail below, system 400 can facilitate configuration for sidelink broadcast communication among vehicles or vehicle device such as RSU to vehicle, vehicle to vehicle, etc., using directional antennas for inter-vehicular or inter-drone applications. The configuring or configuration of the sidelink signals or communications, as further discussed herein, includes the physical signal structure for sidelink ranging (ranging with sidelink signaling) and positioning in LTE and NR technologies.

In various aspects discussed herein, signals/messages/communications can be generated and output for transmission, or received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor(s) 510, etc.) can comprise one or more of: identifying physical resources associated with the signal/message, detecting the signal/message, resource element group deinterleaving, demodulation, descrambling, or decoding.

Referring to FIG. 5, illustrated is a block diagram of a system 500 employable at a Base Station (BS), eNB, gNB or other network device (e.g., a V2X node as eNB/gNB 111/112) that can enable generation and processing of configurable search spaces and related resources (e.g., times, time instances, CCEs, aggregation levels, or the like) for one or more UEs (e.g., URLLC UEs, or non-URLLC UEs) according to various aspects described herein. System 500 can include one or more processors 510 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can facilitate configuration of UE(s) for transmission of URLLC UE transmission(s) involving adaptable configuration(s) of one or more of search space, control channel resources, CCEs, aggregation levels, time instances, indices or the like.

Figure 6:
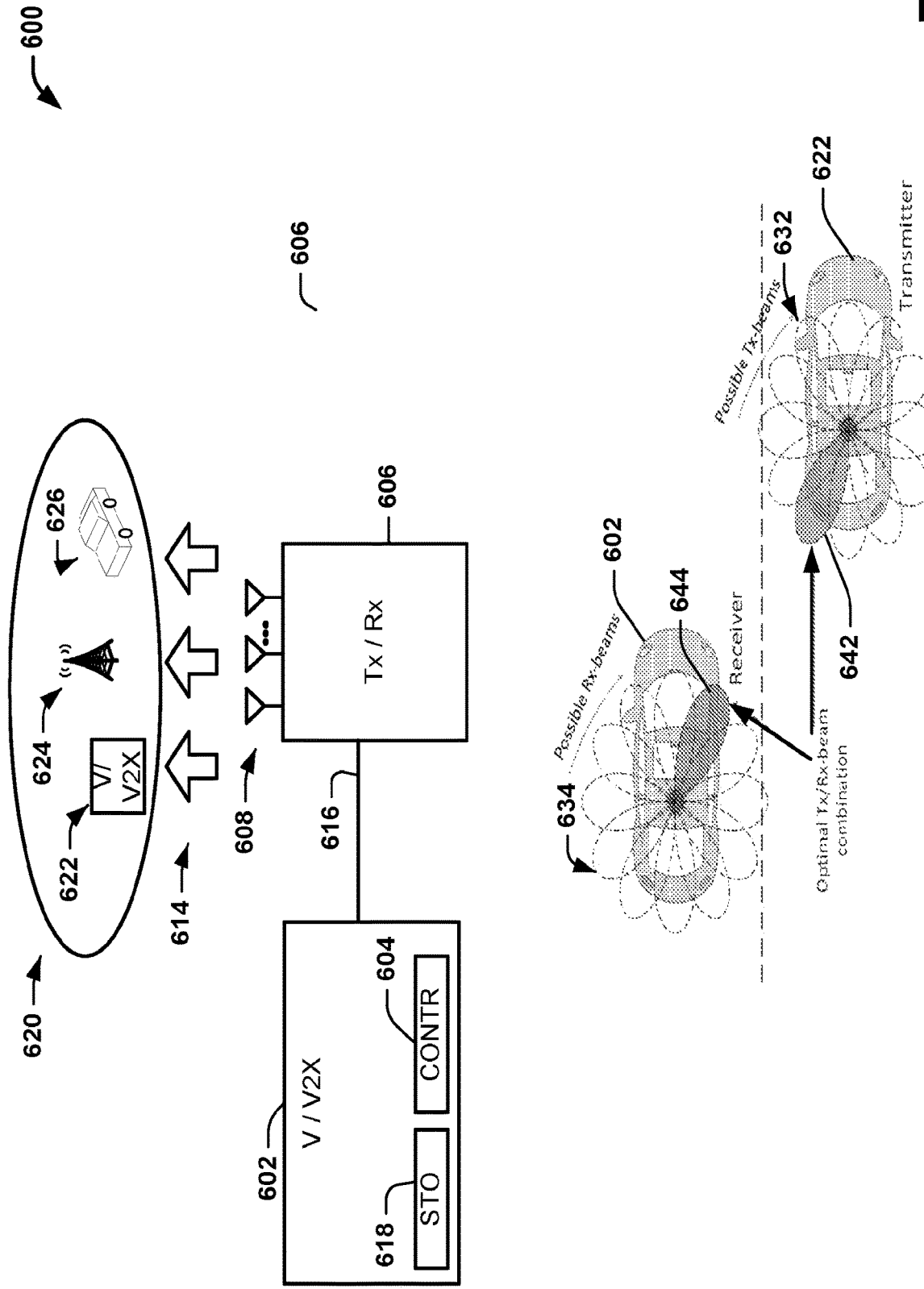
FIG. 6 is a block diagram illustrating a system arrangement for vehicle communications and an example of broadcast communications with directional antennas, according to various aspects discussed herein.

FIG. 6 is a diagram illustrating a system 600 for vehicle communications. The system 600 facilitates broadcast communications by enhancing reliability and accuracy to broadcasted information. The vehicle communications include broadcasts of emergency services information.

The system 600 includes a vehicle/pedestrian user equipment (V/V2X-UE) 602, a transceiver 606, and vehicle/traffic participant entities 620, which can represent the V2X node (V-UE) 500 or the vehicle device UE (or vehicle device) 400 as either a V2X device or node as well. Although not shown, other components such as a packet gateway (PGW), a secondary gateway (SGW), a mobility management entity (MME), a packet data network (PDN), UEs, eNB, gNB or the like can be included, as described herein.

The V/V2X-UE 602 includes the transceiver 606, a storage component 618, and control circuitry or controller 604. The storage component 618 includes a memory, storage element and the like and is configured to store information for the V/V2X-UE 602. The controller 604 is configured to perform various operations associated with the V/V2X-UE 602. The controller 604 can include logic, components, circuitry, one or more processors (410, 510, baseband circuitry processors 204A-E, or the like). The transceiver 606 includes transmitter functionality and receiver functionality. The V/V2X-UE 602 also includes one or more antenna 608 for communications, which includes emergency services broadcast communications 614 with the vehicle/traffic participant entities 620.

The vehicle/traffic participant entities 620 include one or more pedestrians 622, infrastructure entities 624, vehicle entities 626 and the like. The communications between the V/V2X-UE 602 and the vehicle entities 620 includes Vehicle to Everything (V2X), which includes Vehicle to Vehicle (V2V), Vehicle to Infrastructure (V2I) and Vehicle to Pedestrian (V2P). The entities 620 can also include a road side unit or RSU, which is an entity that supports V2I and is implemented in an eNodeB or a stationary/non-stationary UE/IoT.

The vehicle communications between the V/V2X-UE 602 and the vehicle or pedestrian entities 620 utilize co-operative awareness that includes information from other vehicles, sensors and the like, to process and share the information to provide vehicle services such as collision warning, autonomous driving, and the like. The V2V communications are between V/V2X-UEs that may be served by an evolved universal terrestrial access network (E-UTRAN) or at least one of communicating V/V2X that could be out of network coverage. The V2I communications include application layer information to RSUs. The RSU sends application layer information to a group of UEs/vehicles/mobile devices. The V2I also includes vehicle to network (V2N) communication where one party of the communications is a V/V2X-UE or UE and the other party is a serving entity, where both support V2N applications. The V2P communications are between distinct UEs, including V/V2X-UEs and pedestrian associated UEs, where one UE is for each. The V2P communications include V2P related application information.

Communications/communication configurations herein can include transmission resources, a frame structure design, a transmit power for broadcast (communication), a subframe structure, a modulation and coding scheme (MCS), number of occupied sub-channels/Time Transmission Intervals (TTIs), a resource reservation interval/period, range of transmission per transport block (TB), channel busy ratio (CBR), channel occupancy ratio (CR), CR limit (CR_limit), associated LTE parameters in 3GPP, or the like. For example, the frame structure has parameters including sampling rate, frame length, subframe length, subcarrier spacing and cyclic prefix length and are based on the obtained success ratio. The subcarrier spacing can be higher, such as 30 kHz or 60 kHz. Transmission resources can include a physical resource allocation (PRA) unit having a number of symbols and subcarriers. The number of symbols and subcarriers is the size of the PRA unit and is typically selected for a smaller size and higher granularity than LTE resource units. The transmission resources also include selected repetitions of the broadcasted information or a repetition rate. The repetitions can enhance reliability in case of interference, noise, and the like. Repetitions can include repetitions in the time domain/frequency domain. A repetition can be in separate frames, within a frame, in separate subframes, and the like. The number of repetitions and whether the repetitions are within separate frames, within a frame, in separate subframes and the like is based at least partially on the obtained success ratio. A subframe can include a control channel and a data channel. The control channel can include control information for decoding and obtaining communication data (e.g., a broadcasted emergency services information, or other communication) from the sidelink shared channel.

In some embodiments/aspects, sensing procedure(s) defined for autonomous resource selection by vehicle UEs can be adapted for V2Xs 602 by integrating partial sensing to reduce UE power consumption and minimize impact on V2V communications, for example. In addition, various embodiments can be compatible with the legacy LTE/NR V2V sensing procedure(s).

In some embodiments/aspects, sensing procedure(s) defined for autonomous resource selection by vehicle UEs can be adapted for V2Xs 602 by integrating partial sensing to reduce UE power consumption and minimize impact on V2V communications. In addition, various embodiments can be compatible with the legacy LTE V2V sensing procedure(s).

Embodiments or aspects further include sidelink (direct) broadcast communication using directional antennas in NR and LTE technologies to operate in low (e.g. below 6 GHz) as well as high frequency bands (above 6 GHz, e.g. mmWave). Advantages can include simplifying broadcast communication protocols with directional antennas that can be applied for communication between vehicles/drones/ associated node infrastructures.

Sidelink unicast/groupcast/broadcast communication between devices equipped with directional antennas (or adaptive antenna arrays) without losing beam forming gain and utilizing minimum amount of spectrum resources can be the objective for many of the embodiments/aspects herein. Some embodiments or aspects include the following: synchronization in time and frequency to enable synchronous sidelink communication; utilization of terminal geo-location information for sidelink radio-resource managements; sidelink beamforming management at the UE TX and RX sides for unicast/groupcast/broadcast communication in high frequency bands using directional antennas or adaptive antenna arrays for distributed or collocated antennas systems.

Other embodiments/aspects further include the use of wireless communication systems such as for example cellular 3GPP LTE and NR technologies to assist in accurate vehicle positioning. Both wireless technologies can be used to improve vehicle location utilizing inter-vehicle and vehicle-to-infrastructure communication and ranging protocols to determine or refine vehicle coordinate(s) based on sidelink measurements. Physical network and signal structure design aspects, resource selection and signaling procedure for sidelink ranging in application to V2V services, including vehicle (UE) positioning are further proposed with an aim to increase accuracy and minimize latency of ranging protocols.

LTE and NR technologies do not necessarily define practical solutions to enable ranging between UEs using sidelink air-interface as with the embodiments/aspects herein. Vehicles, RSUs or V2X nodes, for example, can measures signal location parameters such as phase difference, time of arrival, time difference of arrival, propagation delays, angle of arrivals to extract information about inter-vehicle or vehicle-RSU distances/ranges. These additional measurements between vehicles/RSUs, can be used to improve the accuracy of location estimation obtained in in-coverage or out-of-coverage cases. This can be done by enabling sidelink ranging and estimation of signal location parameters for 3GPP LTE and NR technologies focusing on V2V applications, although these embodiments can be extended to drone-to-drone communication or other network services, such as the physical layer resource allocation and resource selection options for transmission of sidelink ranging signals or sidelink ranging channel.

The communication link is described by a pair of TX/RX beams set at the TX and RX node 622, 602, respectively, or vice versa 602, 622, as an example. The proper setting of TX/RX beams 632, 634 can optimize channel propagation characteristic(s) for given communication link. If TX/RX beams 632, 634 are not selected properly then significant link budget loss can be expected. Accurately selected beams (e.g. beams directed towards each other) can provide significant beamforming gains and thus increase received signal power of unicast links.

The tuning of receiver (Tx) and transmitter (Rx) beams as beams 632 and 634, respectively, is typically done by means of dedicated beam training procedure at the Tx 622 and Rx 602 sides (that assumes exchange of reference signals from each side), where best beams 642 and 644 is selected at both sides of the link. V2X use-cases demands to support broadcast communication (i.e. transmission mode—when message from one transmitter has to be delivered to multiple nodes). However, broadcast communication using directional antennas is not a trivial problem, especially in vehicular environments, given that each RX node (e.g., V/V2X 602) has its own optimal RX beam settings and it is challenging to optimally set TX beams 632 to satisfy all RX nodes (e.g., 602). Therefore, instead of using one TX beam 642, the TX beam sweeping procedure can be applied at the TX side 622 to cover all transmission directions of interest within given viewing angle of interest (sector of interest).

The optimal setting of TX and RX beams 632, 634 for all links requires a lot of training time and implementation overhead in beam sweeping (overhead on transmission of training signals). However, if proper beam sweeping is not implemented at the TX or RX side 602, 622, then beamforming gain can be lost resulting in degraded system performance. As such, embodiments/aspects herein enable adjusting Tx- and Rx-beams 632, 634 by using geo-location based beam-forming procedure in order to resolve the problem of broadcast communication with directional antennas in vehicular environments without losing beam forming gain and utilizing minimum amount of spectrum resources. In particular, the aspects of setting Tx/Rx states of directional antennas for broadcast communication can be applied for inter-vehicle and inter-drone communication.

In various embodiments, broadcast communication using directional antennas can be made more efficient with the antennas 608 being adaptive antenna arrays 608 configured to perform beam sweeping to form a direction radiation pattern such as with TX beam 642 and Rx beam 644. Such calibrated antenna arrays 608 with spatial scanning or beam sweeping capabilities within predefined viewing angle/sector can be configured at the V/V2X 602, 622 with one or both analog and digital beam forming used to form spatial beams into specific transmission/reception spatial directions. In embodiments, the beam management function, residing at the UEs 602, 622 can thus control the antenna system 608 so that each beam covers a certain viewing angle in a space with respect to antenna array bore sight direction.

In one embodiment, the V/V2X 602/622 can be configured to perform a synchronization to establish a common transmission timing and frequency among V2X nodes. Wide area synchronization in time and frequency can be acquired from eNB/gNB, RSU, GNSS or by other means. The level of synchronization, for example, can be sufficient to align transmission timing across nodes and determine symbol boundaries with sufficient accuracy so that timing error for all nodes is within cyclic prefix (CP) duration. The common notion of time across nodes can facilitate synchronous operation that could help to simplify many of system procedures including beam management for broadcast communication.

In another embodiment, geo-location information of V/V2X nodes 602, 622 can be used for beam and spectrum resource management. Each node/vehicle can be expected to obtain/store precise coordinates and orientation of antenna system installed in the vehicle or itself, including antenna system bore sight direction. The precise location information can be acquired through GNSS or by means of any other location technology (camera, sensor, lidar, radar, cellular positioning, etc.). The knowledge of geo-location information can be used in beam management functions at the TX and RX nodes as described in more detail herein.

In various aspects, the V/V2X 602, 622 can enable beam and spectrum resource management using geo-location information of V2X nodes according to one or more techniques or approaches, including: i) an association of the geo-location information with spectrum resources/channel resources/other resources; and ii) over-the-air indication of geo-location information and a transmission schedule/set of transmission schedule information.

With respect to the approach including association of geo-location information with spectrum resources, different sets of resources can be assigned to V/V2X 602, 622 such as via communication between an RSU as 622 and a vehicle as 602, for example. Spectrum resources can be designated as time (e.g. time slot index), frequency (e.g. frequency channel or sub-channel index), beam (e.g. codebook pre-coder index or antenna port index), or possibly reference signal index (e.g. cover code or sequence), as well as others described herein. The resources can be associated with absolute or relative geo-location information (e.g. coordinate). In case of relative coordinates, it can be defined with respect to location of an RSU or a location of any other road object.

In one embodiment, ranging can be performed based on a response or derivation of the geo-location data from a signal such as a sidelink communication signal. The position/geo-location information can be extracted based on a geolocation operation via components of the V/V2X including radar, lidar, GNSS camera, or related sensors based on the sidelink communication received from or transmitted to the target vehicle/node.

The V/V2X 602, 622 can utilize a function f( ) that provides one to one mapping between vehicle coordinates or other geo-location information (e.g. velocity vector) and spectrum resources to be used for transmissions or communications (e.g., sidelink/direct communications) based on the most recent evaluation of geo-location information at particular time instances (sampling of geo-location information) of the V/V2X node itself as well as a target V/V2X node, or the Tx and Rx side devices of the communication links.

For example, the function f( ) can comprise the following: $[t_i, f_i, s_i, c_i]$=function (x(t)-longitude, y(t)-latitude, z(t)-altitude, derivatives of x(t), y(t), z(t)), where $t_i$ can be defined as the time resource index (e.g. symbol, slot, subframe, frame index, etc.), defined within sidelink resource pool and to be used for transmission; $f_i$ can be defined as the frequency resource index (e.g. set of physical resource blocks (PRBs), sub-channel, etc.) defined within sidelink resource pool and to be used for transmission; $s_i$ can be defined as the beam index (spatial resource index, e.g. antenna port, precoder index, codebook index, etc.) to be used for transmission; a can be defined as the code index (e.g. reference signal sequence index, cover code, cyclic shift, etc.) to be used for transmission; and t can be defined as the absolute time, indicates time instances when geo-location coordinates and their derivatives are being evaluated.

In another aspect of this embodiment, the inverse of the function as an inverse mapping function $f^{-1}( )$ can be also defined and utilized for mapping between vehicle coordinates or other geo-location information (e.g. velocity vector) and spectrum resourced to be used for transmission. This inverse function takes spectrum resource information (e.g. time slot index, frequency channel or sub-channel index, codebook pre-coder index or antenna port index, reference signal index (e.g. cover code or sequence)) as an input argument and as output provides information about target geo-location (e.g. set of coordinates) corresponding to this particular spectrum resource. The set of resources can also comprise a time resource, a time resource index, a time interval, a frequency resource, a frequency resource index, a frequency range, a beam index, a coding index, an analog or digital spatial pre-coding, a code spreading, a set of user equipment (UE) specific parameters, a set of system parameters, or a set of location parameters, coordinates or related data.

In other embodiments, with respect to over-the-air indication of geo-location information and a transmission schedule information, the V/V2X 602, 622 can receive the geo-location information directly from the other V/V2X 602, 622. This can be done in response to a request, updated periodically by the network node/directly from another vehicle, or other trigger (e.g., a sidelink communication). The communication system 600 can utilize multiple bands, e.g. low band (below 6 GHz) and high band (above 6 GHz). For vehicular applications Intelligent Transportation Systems (ITS), the 5.9 GHz (low) and 60-80 GHz (high) bands can be utilized where transmission operation with directional antennas or antenna arrays is a key attribute for 60-80 GHz band, while in the low band the omni-antennas can be used. Any other bands or bands combinations can be defined without loss of generality also.

Figure 7:
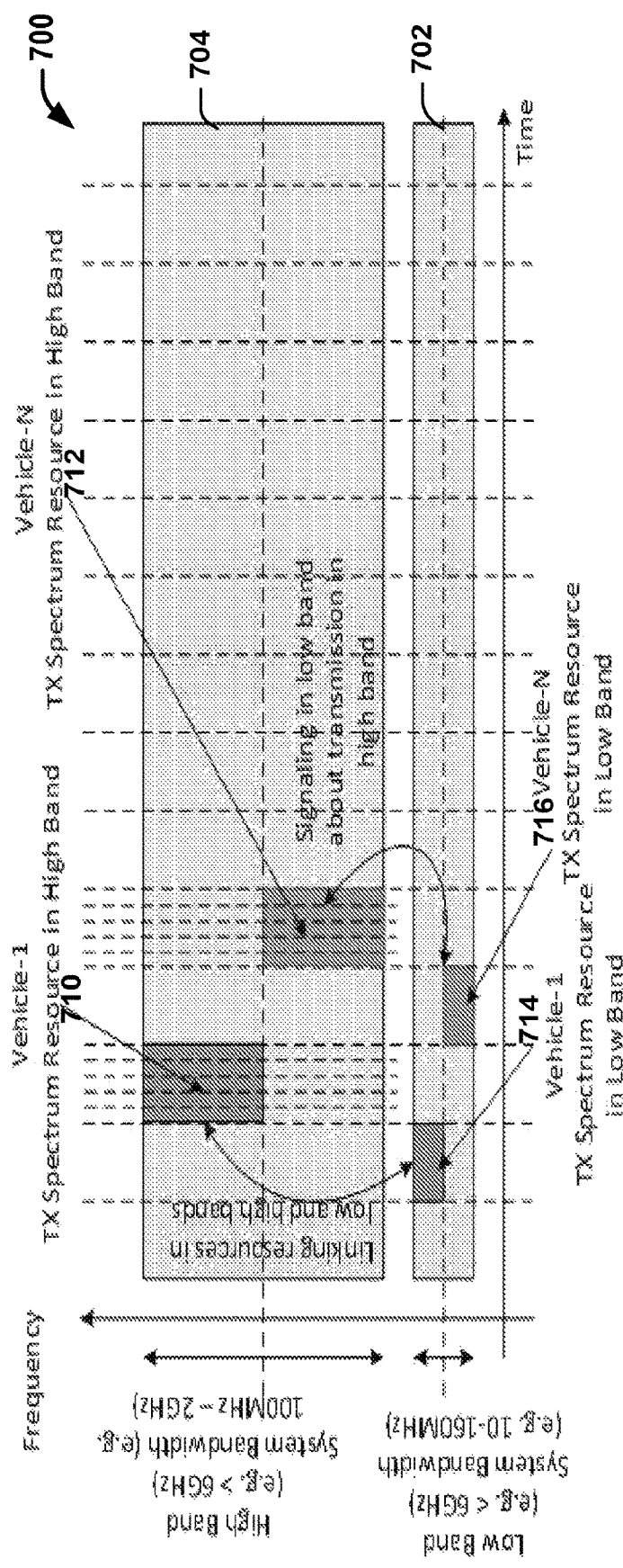
FIG. 7 is a diagram illustrating an example of multi-band communication to assist beam management as well as resource management (including time-frequency-space resources) for broadcast/unicast communication using directional antenna patterns according to various aspects discussed herein.

Referring to FIG. 7, illustrated is an example sidelink communication system 700 for broadcasting using directional antennas with inter-vehicular or inter-drone communications/applications. Vehicles 602 and 622 can communicate in dual bands (low band 702 and high band 704), or as a multiband communication system by communicating on one band to assist communication in the other band(s). For example, communication in low band 702 can be used to assist broadcast communication in the high band 704, or vice versa from high to low. In an example, the low band 702 can provide control signaling to efficiently organize broadcast or unicast communication using directional antennas in the high band 704.

Communications can be broadcast as sidelink communications, for example, with a directional antenna array or adaptive antenna array in the high band 704, while using an omni-directional antenna array or a directional antenna array in the low band, for example, or vice versa. Resources (e.g., spectrum resources as disclosed herein, such as radio-layer parameters or the like) can be communicated or broadcast in one band (e.g., low band 702) to be used or being used in another band (e.g., the high band 704).

In an example, each transmitter before it starts transmission in high band 704 can announce in the low band 702 the set of radio-layer parameters (physical layer or MAC/RRC/RLC layer) that will be used for communication in high band 704. An example of such multiband operation is broadcasting of node geo-location information in a low band 702 that can be used to assist communication in high band 704 between vehicles or nodes as well as to trigger another vehicle or node to response with the same or enable a derivation of such data for geo-location by determining distances or other location information, for example.

In an example, V2X node 622 can broadcast its geo-location information (geographical coordinate, velocity vector—magnitude and direction, etc.) to be used by receivers for RX beam selection at node 602, for example, such as by sidelink communications. Besides sharing own geo-location information, nodes 602, 622 can also exchange information about specific time frequency resource to be used for transmission or TX beam sweeping/management procedure at high band 704 using control signaling in low band 702 (announcement signaling sharing parameters required for communication in high band 704). For instance, each vehicle/V2X 602, 622 can acquire information about spectrum resources [$t_i$, $f_i$, $s_i$, $c_i$] or other physical layer parameters of transmission through information exchange and control signaling in low frequency band (the signaling in low band 702 is possible due to usage of omni-directional antennas).

The signaling can be from high to low band, rather than from low to high for indicating resources related to other band as well, and be concurrent or simultaneous to one another in time from the same node or different nodes. For example, a first vehicle 602 can transmit spectrum resources in a high band 710 that can be used or associated with resources to be used in a low band (see arrow from 710 to low band 714), as well as vice versa where the low band spectrum resource 714 can be used to signal resources for communications being transmitted by the same vehicle/V2X node (Vehicle-1) in the high band at 710. Similarly, resources (including control information or channel control information including time, frequency, coding resources or other parameters herein) and communication data can be broadcasted with other vehicles or nodes also as illustrated at vehicle 622 (Vehicle-N) transmitting spectrum resources 712 in the high band 702 and spectrum resources 716 in the low band 702.

In another example, the results of a sensing and resource selection operation being implemented in one of the bands (e.g. low band 702) can be projected to another band (e.g. high band 704). For example, time frequency spectrum resources 714 in low frequency band 702 can be directly associated with spectrum resources in high frequency band (linked bands or resources within bands). In this case, the results of sensing and resource selection in one band (e.g. low band 702) can be applicable and used for transmission in another one (e.g. high band 704). This can simplify implementation, save implementation overhead and increase reliability of communication. Also monitoring transmissions in low frequency band 702 at each node can get information about resources in high band 704 (e.g. as occupied, non-occupied or reserved). Beam-forming procedure as well as transmitter and receiver behavior for both approaches discussed above are described below in a more details.

Figure 8:
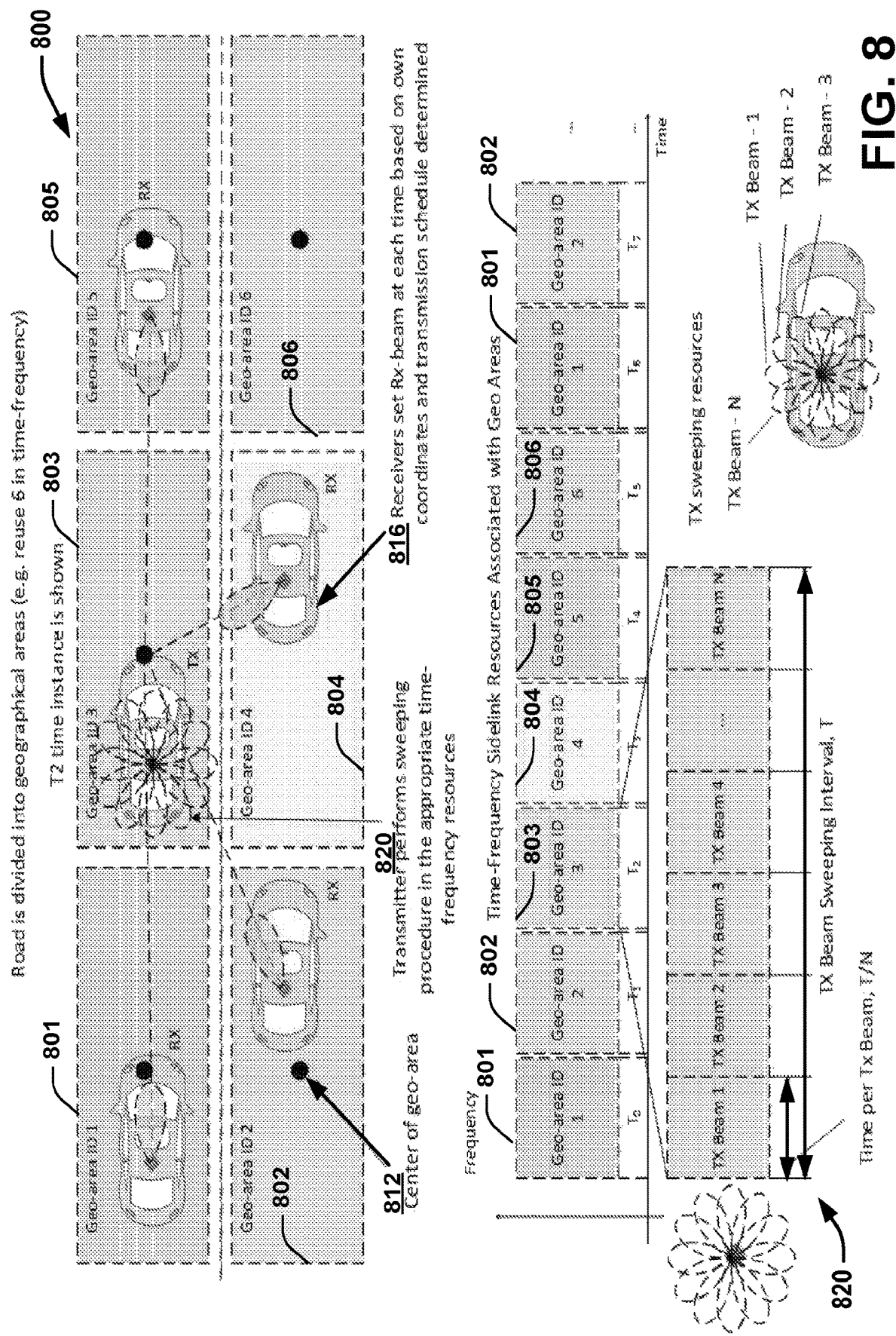
FIG. 8 is a diagram illustrating an example of beam and resource management based on the geo-location information for broadcast communication using directional antenna patterns, according to various aspects discussed herein.

Referring to FIG. 8, illustrated is an example vehicular communication system 800 with beam management operations as well as resource management (including time, frequency, and space resources) based on geo-location information for broadcast communication via directional antenna patterns.

In order to save implementation overhead for broadcast communication with directional antennas, the V/V2X 602 or other vehicle node can determine data to know how to tune RX beam when transmitter performs TX beam sweeping 820. In this case, RX beam sweeping can be skipped and beam management/training protocol can be significantly simplified. The RX beam can be tuned properly if the V/V2X UE is already aware about the beam pointing direction for communication such as a sidelink communication.

As discussed above, this awareness can be enabled through beam and spectrum resource management based on an association of geo-location information with spectrum resources (as a first approach). In this case when spectrum resources are associated with geographical information (UE ID, area ID, location, coordinates, velocity, acceleration, as related to the target node, etc.), the vehicle(s) of areas 801-806 (e.g., Geo-area ID 1, Geo-area ID 2, Geo-area ID 3, Geo-area ID 4, Geo-area ID 5, Geo-area ID 6) can determine the RX beam pointing direction based on the knowledge of its own coordinate 816 (i.e. coordinate of its own antenna system) and the nearest coordinates 812 associated to the corresponding spectrum resource (i.e. spectrum resource at this time instance). For example, the line of sight (LOS) direction pointing towards the nearest geographical coordinate associated with given spectrum resource can be used.

All V/V2X UE nodes at each area can use the same function [$t_i$, $f_i$, $s_i$, $c_i$]=function (x(t)-longitude, y(t)-latitude, z(t)-altitude, derivatives of x(t), y(t), z(t)). This function can be used by the transmitters of each V/V2X 602, 622 to determine spectral resources for transmission based on their geo-location information or coordinate position/location within a geographic area and its associated geo-area ID. Receivers use this function to automatically tune the RX beam to appropriate direction (which can be determined by inverse function $f^{-1}(\,)$), from which the transmission can be expected at a given time instance.

Referring to FIG. 9, illustrated is another example of sidelink signaling in a sidelink communication system 900 for broadcast communications in LTE and NR networks as a vehicle communication network using directional antennas with inter-vehicular or inter-drone communications/applications. The vehicles 602 and 622 can communicate in dual bands (low band 702 and high band 704) or as a multiband communication system by communicating on one band to assist communication in another band or bands. For example, the communication in low band 702 can be used to assist broadcast communication in high band 704. In particular, the low band 702 can provide control signaling to efficiently organize broadcast or unicast communication using directional antennas in high band 704.

Similar to FIG. 7, communications in system 900 of FIG. 9 can be broadcast as sidelink communications, for example, with a directional antenna array or adaptive antenna array in the high band 704, while using an omni-directional antenna array or a directional antenna array in the low band, for example, or vice versa. Resources (e.g., spectrum resources as disclosed herein, such as radio-layer parameters, including time resources such as time offset, or period, duration, frequency resources, system parameters such as symbol/slot/subframe/frame index/system frame number/super frame, coding, other parameters related to sidelink communication signaling, other communication data, such as distance data, or location parameters—phase differences, time of arrival, time difference of arrival, propagation delays, angle of arrivals, etc. for extraction of information about inter-vehicle or vehicle-RSU distances/ranges for ranging) can be communicated or broadcast in one band (e.g., low band 702) to be used or being used in another band (e.g., the high band 704).

At 902, a vehicle (e.g., 602, 622) can transmit spectrum resources that also include radio-layer parameters for transmission in the high band as well as a geo-location information (e.g., coordinates, distance information with respect to a position or object, velocity, direction of movement, acceleration, or other geographical location information), in which these resources are also associated with or indicating of communication to be used in the high band 904 (see arrow from 902 to band 904). The radio layer parameters can include a physical layer, or MAC/RRC/RLC layer that will be used for communication in the other band (high 704 or low 702). The same control information of resources and communication can be broadcasted with other vehicles or nodes also as illustrated in Vehicle-N transmitting spectrum resources with resources 906 in the low band 902 being associated with or indicating resources for sidelink communication and ranging in the high band.

In aspects herein, resource management for beam and spectrum resources to be utilized for sidelink vehicle communication can be based on signaling of indications of the geo-location information along with data of a transmission schedule. This can be provided over-the-air (e.g., via downlink/uplink Uu air-interface, or the like) of an LTE or NR network, as with approach 2 or approach ii discussed above.

With over the air signaling of transmission schedule and geo-location information in low band, any vehicle/V2X node 602, 622, for example, can set the receive/receiver (Rx) beam based on the its own coordinate (i.e. coordinate of its own antenna system) and transmitter coordinates shared over the air (e.g., acquired in low band 702). All UEs know their own resources $[t_i, f_i, s_i, c_i]$, to be used for transmission. Based on knowledge about selected spectrum resources and geo location information of transmitters, they can automatically tune the RX beam in a proper geographical direction for reception.

In embodiments, the Rx beam can be fixed during the whole transmit/transmitter (Tx) beam sweeping interval or can be slightly adjusted/adjustable to take into account vehicle mobility. In aspects related to transmitter behavior specifically, user control entity regularly/periodically updates its coordinates (coordinates can be provided by vehicle location subsystem).

For the first approach, where the spectrum resources are associated with geo-location of an area among a plurality of divided areas of a V/V2X node, for beam and spectral resource management the transmitter can determine candidate spectrum resources for transmission based on updated coordinates. If the vehicle or V-UE (e.g., V/V2X 602) has traffic, it utilizes spectrum resource corresponding to the latest candidate resource based on the most recent update of geo-location information. The spectrum resource selection can be done according to a predefined rule that maps geo-location information (e.g., coordinate) to correspond to spectrum resources (e.g. time instance and sub-channel). Receiver(s) of the a V/V2X can automatically tune an Rx beam (e.g., 910, 912) towards the coarse transmitter location (center of geo-area, e.g., center 812 of FIG. 8). The update of the Rx beam can take into account the current Rx vehicle geo-location information and geo-location information of the potential transmitters determined by the inverse function $f^{-1}(\,)$ as disclosed above as the inverse of the function $f(\,)$ being $[t_i, f_i, s_i, c_i]$=function (x(t)-longitude, y(t)-latitude, z(t)-altitude, derivatives of x(t), y(t), z(t)). The Rx can dynamically determine whether to point an Rx beam toward the nearest candidate transmitter or form multiple beams to cover multiple transmitter at the same time.

For the second approach, where over-the-air indication of geo-location information and a transmission schedule is used as approach 2 (or ii), beam and spectral resource management can be performed where UEs (e.g., V/V2X 602, 622) determine spectrum resources for transmission and can tune their own RX beam towards the transmitter location (e.g., as received through low band 702 signaling). The Rx 602 or 622 can also decide to form a single or multiple RX beams at the same time towards the nearest candidate transmitter or multiple transmitters based on this information.

In an aspect, based on the geo-location information ascertained and the transmission schedule (e.g., of the corresponding/counterpart/target communication V/V2X), the selected spectrum resource(s) can be divided by a V/V2X node into N time intervals, where N is an integer greater than one, for example. Each interval can be used for transmission with a predefined beam which is being switched by the transmitter of the V/V2X 602 or 622 from one to another time interval.

The transmitter or transmitting V/V2X 622, for example, can then perform beam sweeping in a predefined sector (viewing angle). The number of beams used for spatial sweeping may depends on vehicle antenna system configuration (e.g. antenna array aperture/beam-width).

Figure 10:
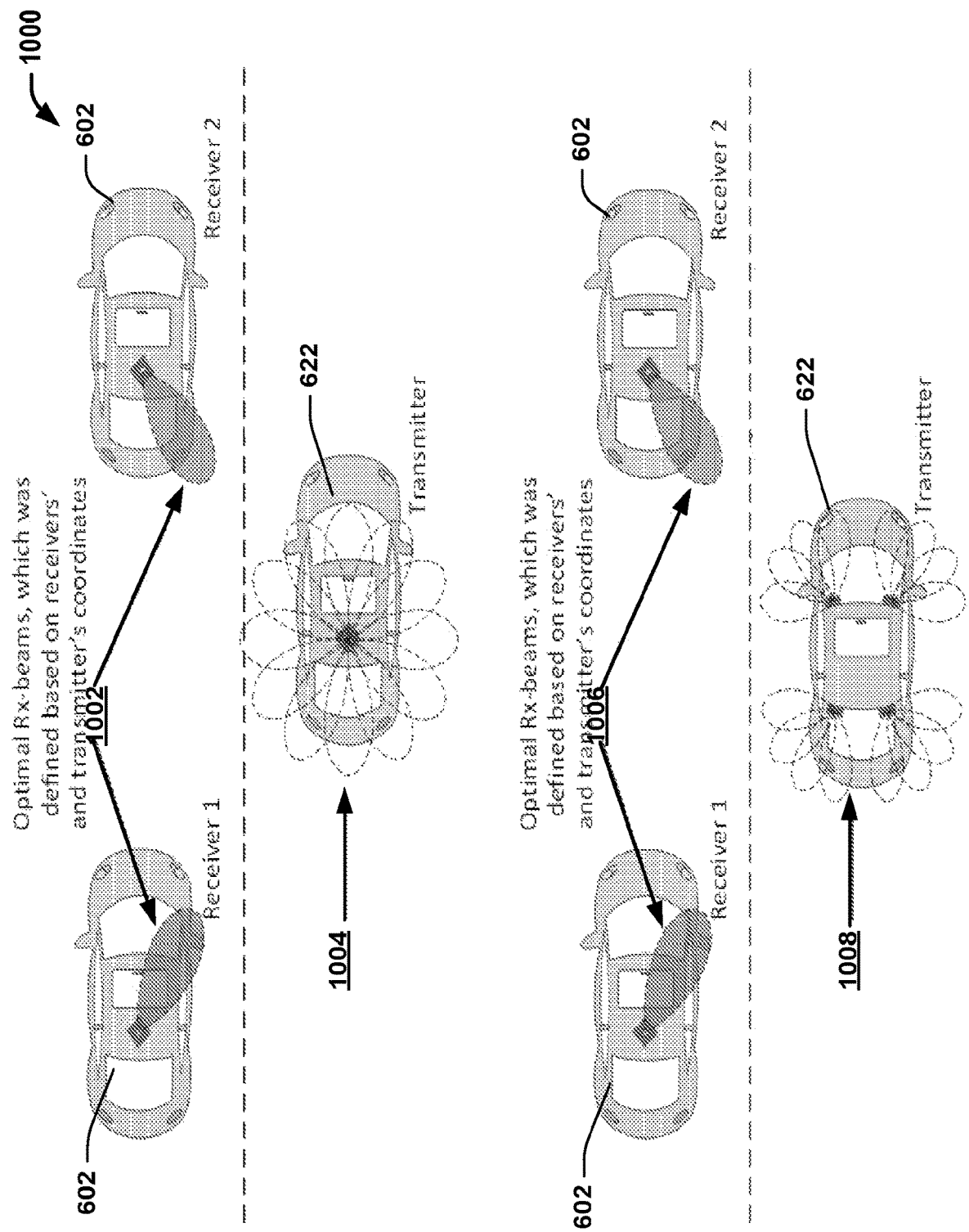
FIG. 10 is a diagram illustrating no prior information about candidate receiver geo-location information, according to various aspects discussed herein.

In one example, referring to FIG. 10, illustrates one example where the transmitter (e.g., V/V2X 602 or 622) is not necessarily aware of receiver locations (e.g., V/V2X 602 or 622) in accordance with various aspects/embodiments herein. For example, a V/V2X 602, 622, a vehicle or other node can be expected to divide the geographical space around it into multiple subsectors, particularly when not aware of candidate receiver locations. The number of subsectors of an area can depend on antenna characteristics/parameters—e.g. half power beam width (HPBW) or other parameter of the V/V2X or terminal.

These processes can performed for distributed antenna systems as with beam forming processes 1002, 1004, and for collocated antenna systems as with beam forming processes 1006, 1008. V/V2X 622, for example, can perform beam sweeping processes 1004, 1008, as a distributed or collocated antenna systems. As illustrated in communication system 1000, beam sweeping can be done by the transmitter for each time interval or area divided. Depending on the location determined of the receiving V/V2X an optimal Rx beam can be defined at 1002 and 1006 based on Rx and Tx coordinates. As such, a dynamic interchange can occur between two vehicles or vehicle nodes based on geo-location information or changing geographical location of the nodes.

Figure 11:
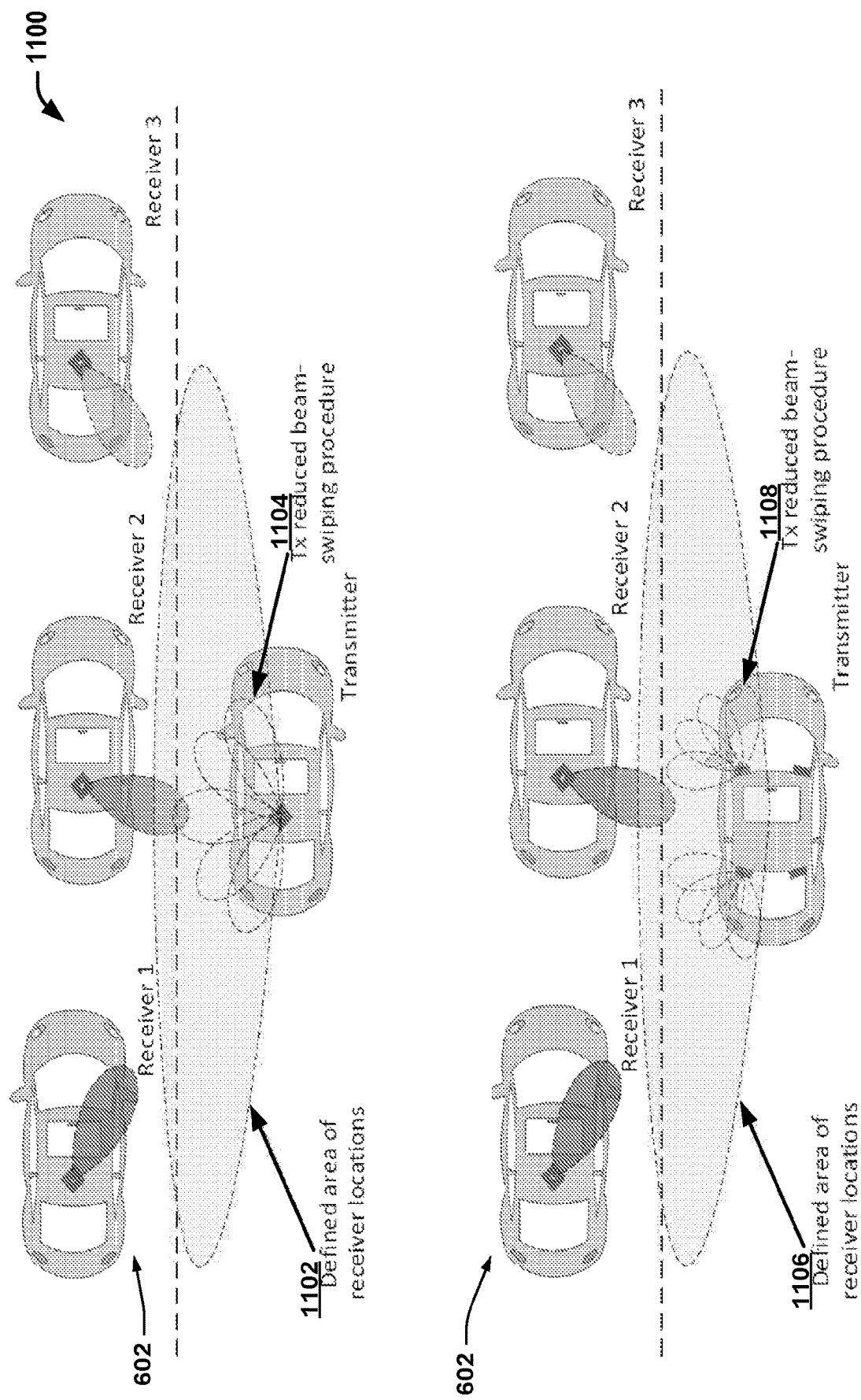
FIG. 11 is a diagram illustrating a priori information about candidate receiver geo-location information, according to various aspects discussed herein.

Referring to FIG. 11, distributed and collocated antenna systems 1100 are further illustrated and can be utilized when a priori information is available about candidate receiver locations or associated resources, such as by an indication over the air. In this example, beam sweeping 1104, 1108 can be reduced, while saving on resources for the Tx side by covering a defined area of receiver locations 1102, 1106 based on the a priori information received.

When the Tx node 622, for example, is aware of candidate Rx locations, the transmitter (e.g., V/V2X 622, or 602) can decide to perform TX beam sweeping 1104, 1108 towards directions of the candidate receivers only, while saving resources such as power and time. In this case the amount of beams to be used for transmission can be reduced decreasing the overall level of interference in the systems as well, while further enabling more informed decision-making operations with resource selection at the V/V2X.

Other aspects or embodiments, can enable the V/V2X 602, 622 to facilitate allocation of time resources such as by time allocation. When transmitters select time-frequency resources, they could take into account a number of TX beam sweepings and duration of a single beam-sweeping, for example. V/V2X 602, 622 can be configured to manage the time resource to be scalable in terms of an amount of beams allocated per time resource. The number of beams can depend on antenna system configuration and viewing angle (e.g. HPBW, number of antenna panels, antenna array size and aperture) as well on availability of a priori information about receivers' positions. In case of no a priori information about RX positions, the number of beams can be calculated or derived based on the following representation as equation 1:

$$N_{beams} = \text{round}\left[\frac{360°}{\alpha * HPBW * N_g}\right],$$

wherein a number of beams can be determined in case of an absence of a priori information about receiver nodes. Here: $N_{beams}$ is a number of beams; a is a scaling factor (can be used as 1 or another integer); $N_g$ can be a number of antenna panels with different bore sight angles. This equation 1 can be further refined by the V/V2X taking into account receiver positions and road configuration, reflecting the fact that not all 360° may have to be covered, due to a linear deployment of vehicles in the road, for example.

Figure 12:
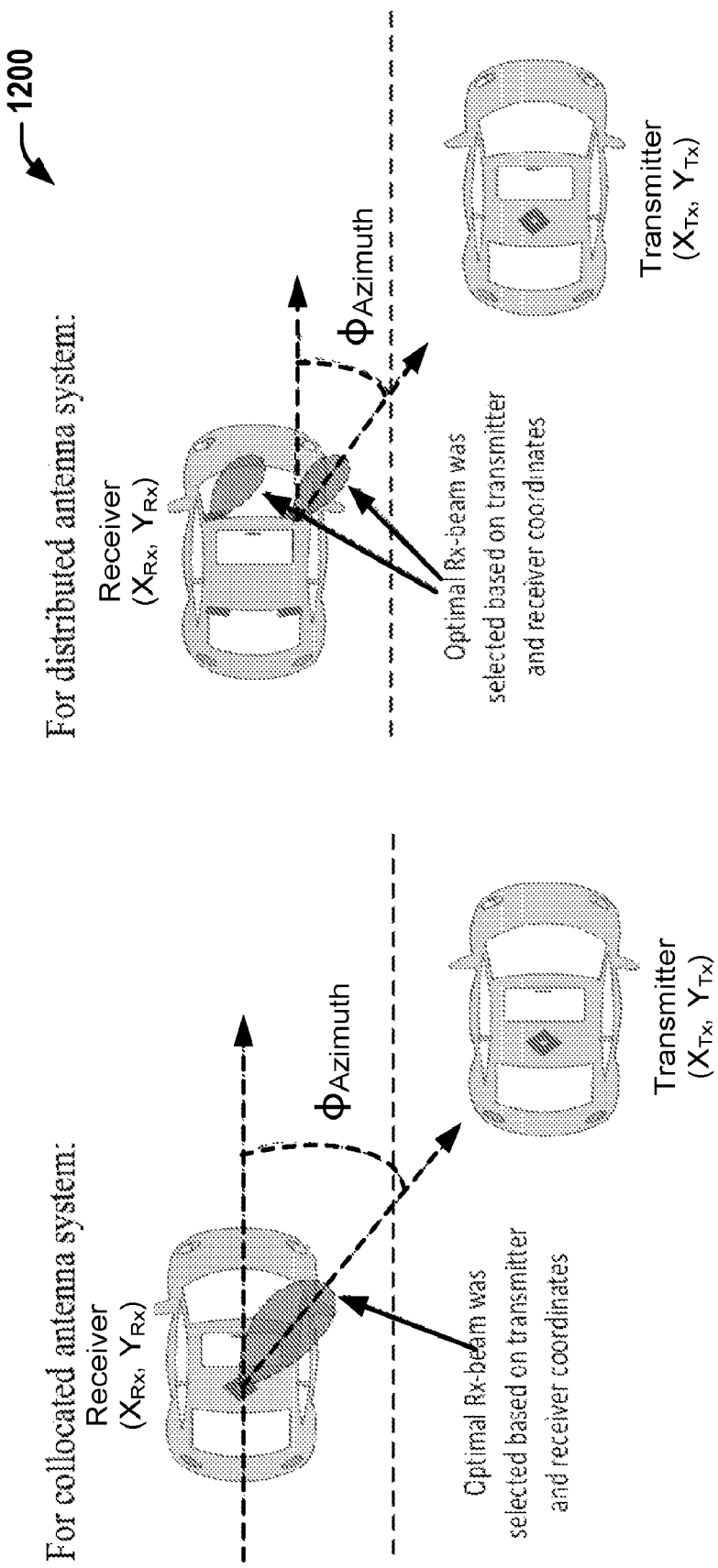
FIG. 12 is a diagram illustrating receiver beam management based on geo-location information, according to various aspects discussed herein.
Figure 13:
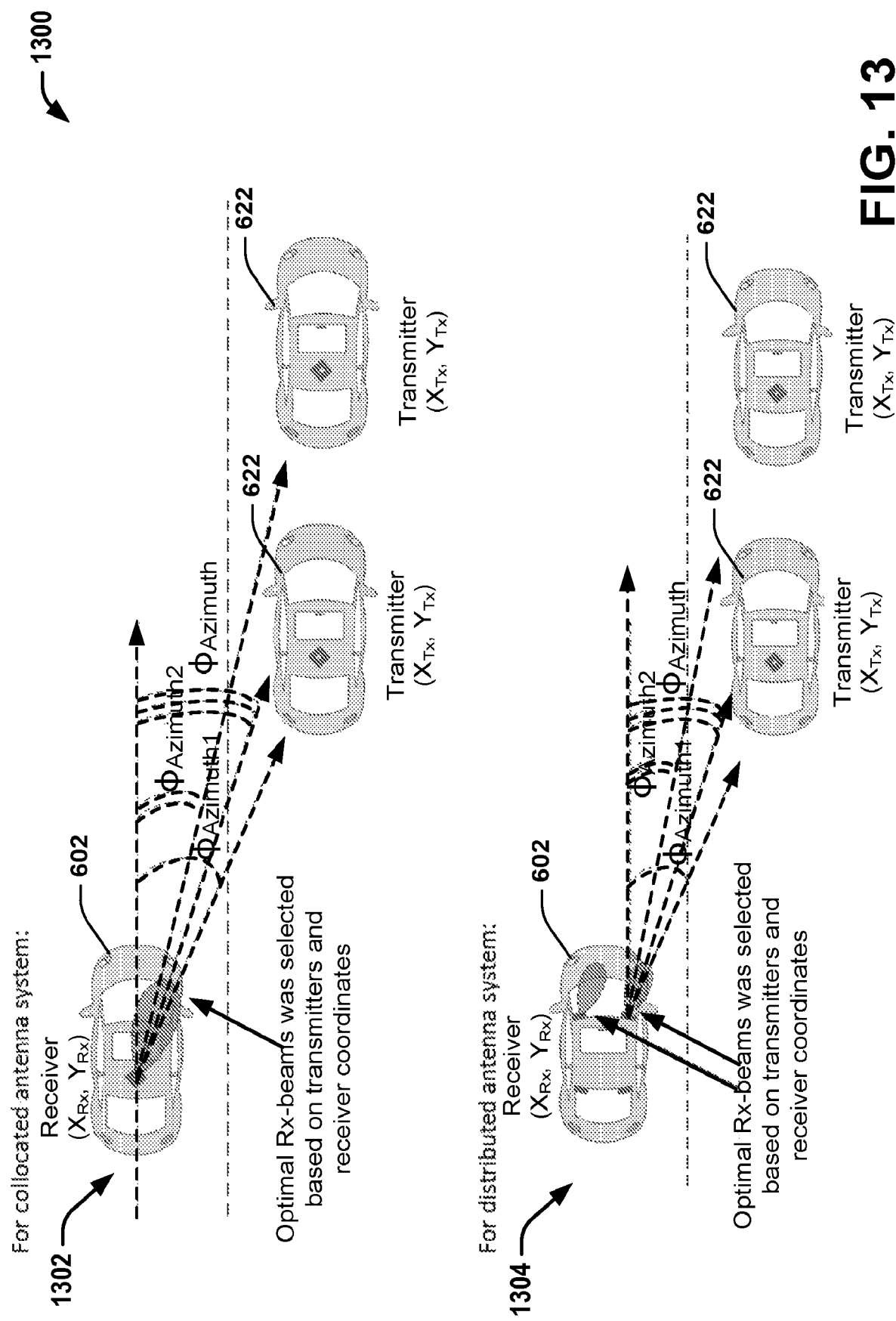
FIG. 13 is another diagram illustrating receiver beam management in the case of collocated transmitter positions, according to various aspects discussed herein.
Figure 14:
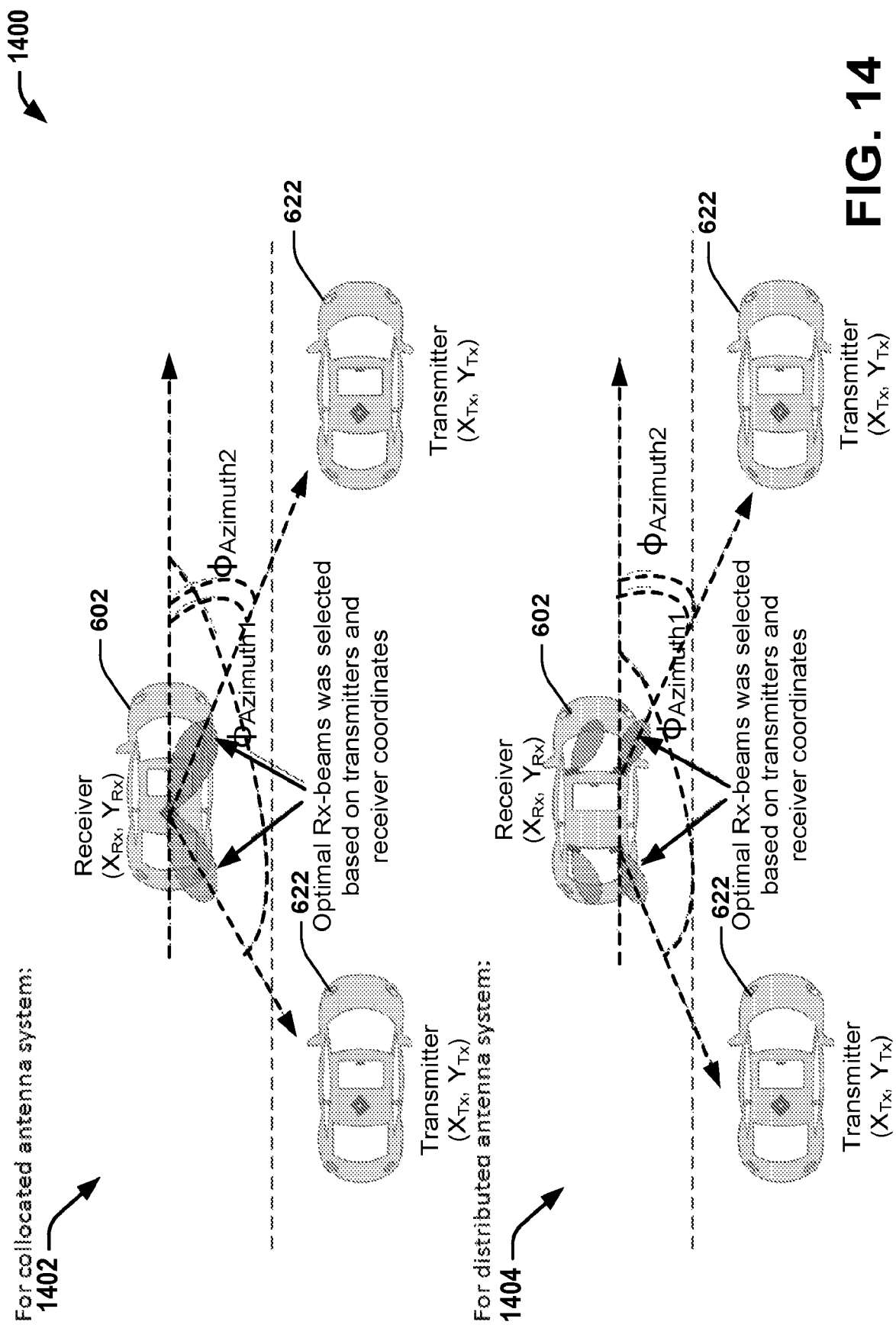
FIG. 14 is a diagram illustrating receiver beam management in a case of distributed transmitter positions, according to various aspects discussed herein.

FIG. 12 thru 14 illustrate aspects or embodiments of receiver behaviors in the vehicular communications systems discussed herein. In each time instance receivers can set their own RX beam points to the transmitters instead of having to form Rx beam-sweeping procedures. Where geo-location information is assigned (as in approach 1/i to particular areas for beam and spectral resource management, a function of mapping geo-location information to spectrum resources is determined by the V/V2X 602, 622. for example. Based on the geo-location information, the receiver can calculate the inverse function of the f( ) in order to determine the Rx beam to be used in a specific time-frequency resource. Where geo-location is indicated/processed/received (as in approach 2/ii) for beam and spectral resource management, a receiver (e.g., V/V2X 602, or 622) can use a transmitting schedule and geo-location information about transmitters which were received from an over air interface to set its own Rx beam in each time instance in an appropriate direction.

FIG. 12 illustrates a receiver operation in a vehicle communication network 1200 where receiver beam/resource management is based on a geo-location information derived from positioning or ranging operations. In order to determine an Rx beam, the V/V2X UE can use a coordinate of the candidate transmitter positions inside a particular geo area (Approach 1), or actual transmitter coordinates (Approach 2) together with its own geo-location information.

If a node needs to receive information from one transmitter (e.g. the nearest one), it can set its own Rx-beam towards the transmitter location using its own coordinate and a coordinate of the transmitter, such as by using the following equation (e.g., equation 2) for an azimuth angle setting by the receiver: $\varphi_{Azimugth} = \arctan 2\ (Y_{Tx}-Y_{Rx}, X_{Tx}-X_{Rx})$, where: $(X_{Tx}, Y_{Tx})$ are transmitter's coordinates, and $(X_{Rx}, Y_{Rx})$ are receiver coordinates. In particular, $\varphi_{Azimuth}$ is not necessarily quantized. In order to determine an Rx beam, V/V2X UE could be rounded to the nearest $\varphi_{Azimuth}$ angle corresponding to the particular beam in an Rx beam set. $\varphi_{Zenith}$ can be found by the similar procedure with using Z coordinates instead of Y in a 3-Dimensional direction, for example.

In various embodiments, if the V/V2X 602 node is going to receive information from multiple transmitters various aspects can be considered or utilized by the device 602. In one aspect, FIG. 13 illustrates a vehicle communication system 1300, where multiple transmitter positions can be considered by the receiver behavior where the transmitters 622 can be relatively collocated with respect to one another/to the receiver 602/central point (e.g., central point 812) as in a similar or same geographic area or division of area (e.g., sub-areas 801-806). Here, transmitters 622 are represented as a plurality of transmitters (e.g., Transmitters 1 and 2) can have similar geographic positions, and can be covered by one Rx-beam (between $\varphi_{Azimuth1}$ and $\varphi_{Azimuth2}$, as found by operation of Equation 2). In this case, it is possible to use frequency division multiplexing to receive from multiple transmitters 622 using the same beam. These operations can be used for a collocated antenna system 1302 and a distributed antenna system 1304, when, for example, optimal Rx-beam or Rx-beams, respectively, are selected based on the transmitters and the receiver coordinates for one or more resources.

FIG. 14 illustrates another example of a vehicle communication system 1400 where multiple transmitters 622 are geographically distributed with respect to one another (e.g., by a certain distance), relative to a central point (e.g., 812), a geographic area (e.g., 801-806) or division (801-806) of an area or an area surrounding the V/V2X. As illustrated, transmitters 622 can have different positions, are distributed among different areas or divisions with respect to one another, and can be covered by different spatial streams/beams by the V/V2X 602. In case of forming different spatial streams, V/V2X 602, 622 can divide its antenna panels or antennas (e.g., 608) into subgroups and each subgroup may have its own beam (precoding) for communication/reception with the distributed transmitters 622 with a collocated antenna system 1402, 1404.

The Transmitters' 622 collocation can be determined via receiver side 602, for example, by analyzing a difference of absolute angles $\varphi_{Azimuth1}$ and $\varphi_{Azimuth2}$ with a threshold as follows: $\varphi_{Azimuth\ 1} - \varphi_{Azimuth\ 2} < $ Threshold, where: $\varphi_{Azimuth1}$ is an angle to the first transmitter, and $\varphi_{Azimuth2}$ is an angle to the second transmitter, and the Threshold can be a proximity of a boundary of an area or subarea, for example.

In a case of there being three and more transmitters 622, which operate at the same time moment in different frequency resources, a similar approach (dividing on collocated and distributed transmitters' positions) can be also be used by the V/V2X 602.

In another embodiment, the V/V2X 602 or 622 can utilize a communication protocol/approach with HPBW reduction by increasing receiver's antenna HPBW to cover streams from different sources, which are divided in frequency. This operation can also can be used to cover more than one transmitter at the same time by a single receive beam, for example.

Other embodiments or aspects include the physical signal structure for sidelink ranging, positioning, and communication in LTE and NR technologies or networks.

In order to further improve vehicle positioning accuracy, ranging/positioning protocols between vehicles can be enabled at the V/V2X 602, 622 devices or nodes for communication between vehicles and road side units (RSU) or other infrastructure units/nodes). For example, vehicles or RSUs, as the V/V2X 602, 622, for example, can measures signal location parameters such as phase difference, time of arrival, time difference of arrival, propagation delays, angle of arrivals, etc., to extract information about inter-vehicle or vehicle-RSU distances/ranges, or other like parameters, for example. These additional measurements between vehicles/RSUs, can be used to improve the accuracy of location estimation obtained in in-coverage or out-of-coverage cases as well as the resource management operations discussed herein.

As such, various embodiments/aspects can include design options to enable sidelink ranging and estimation of signal location parameters for 3GPP LTE and NR technologies focusing on V2V applications, and these design options can be easily extended to/for drone-to-drone communication, or other services. In particular, the designs include the physical layer resource allocation and resource selection options for transmission of sidelink ranging signals or sidelink ranging channel according to various embodiments or aspects being disclosed.

Figure 15:
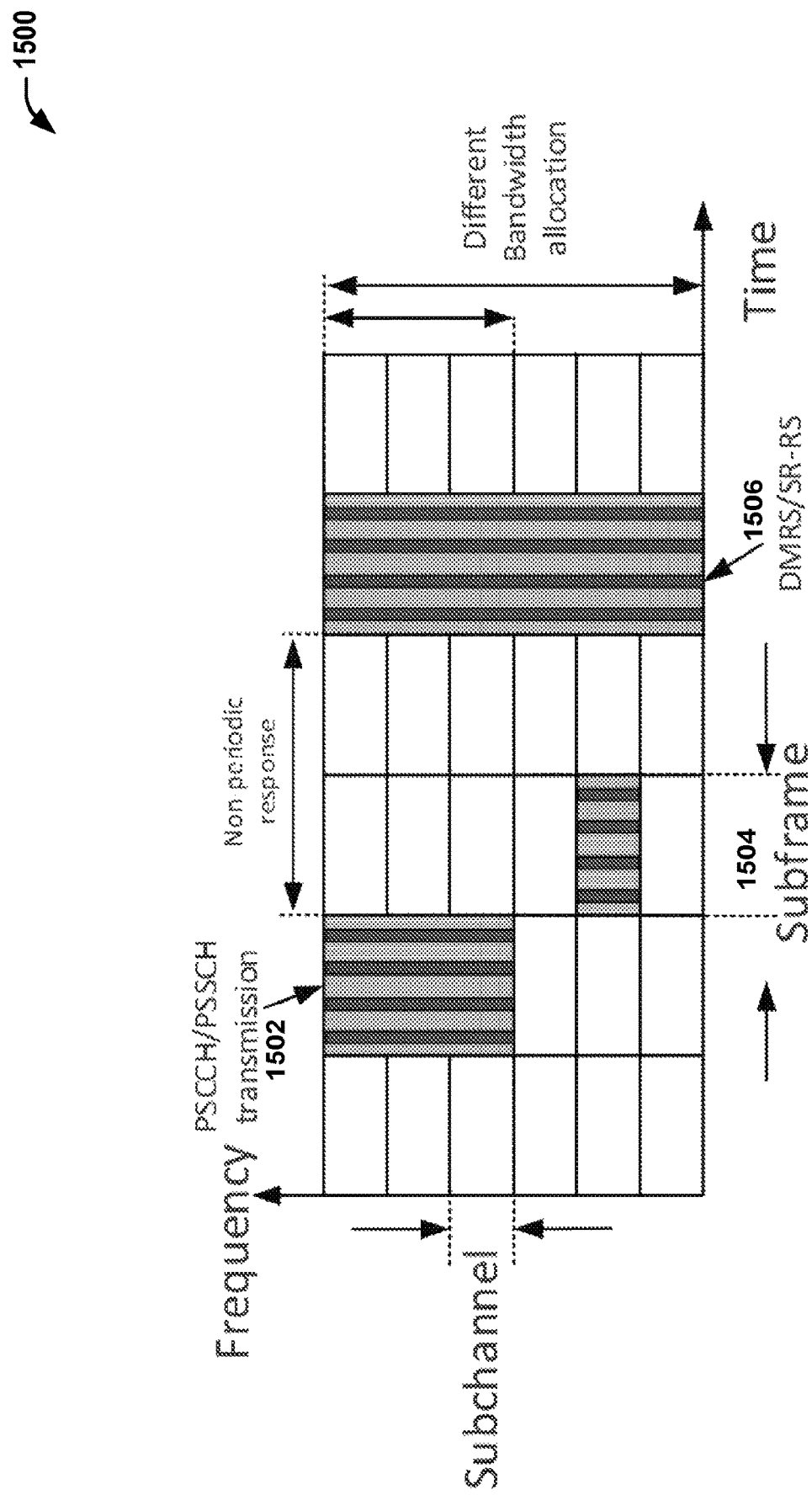
FIG. 15 is a diagram illustrating a sidelink PSSCH transmission with DMRS signal used as a sidelink ranging signal, according to various aspects discussed herein.

Referring to FIG. 15, illustrated is an example of various embodiments of the sidelink communications that can include a sidelink demodulation reference signals (DMRS) of a physical sidelink shared or control channel (i.e. PSSCH/PSCCH/PSDCH) within resources of transmission at 702 that can be used for sidelink ranging related measurements, e.g. time of arrival estimation of the signals from different nodes, signals strength, and sidelink communication protocols. As such, the sidelink DMRS can be signaled or configured as a partial bandwidth 1502, as a subframe or subcarrier 1504, or along an entire/full/complete bandwidth 1506 in accordance with other various aspects/embodiments described herein and detailed further below.

Utilizing a sidelink DMRS for sidelink communication to enable ranging based on positioning or geo-location information for sidelink communication can have different advantages, including there being no dedicated sidelink physical channel or signal design to perform ranging. In addition, sensing based channel access procedure (resource selection) used for PSCCH/PSSCH automatically ensures favorable channel propagation conditions from sidelink interference environments and a collision perspective. Further, ranging control information as resources discussed herein can be multiplexed within existing V2X sidelink channels (control (PSCCH), shared (PSSCH), discovery (PSDCH)). However, this can potentially increase overhead in case if there is no need to transmit other V2X data; otherwise, sidelink ranging signal transmission is subject to traffic arrival rate and congestion control. The congestion control can prevent periodic ranging in a system. Time between ranging signal transmission and ranging signal reception/response is also subject to UE specific traffic generation rate (at ranging initiator and ranging responder). Ranging signal transmission bandwidth can be determined by general sidelink allocation used for data transmission.

In other embodiments, the sidelink communication can be a dedicated sidelink ranging signal (SL-RS), which can also be referenced herein by other terminologies. The following terms can be used to designate this signal such as a Sidelink Ranging Reference Signal, or Sidelink Positioning Reference Signal, or Sidelink Sounding Reference Signals). The term Sidelink Ranging Reference Signal (SR-RS) can be used to describe the dedicated sidelink signal used for estimation of signal location parameters and sidelink channel resources between UEs for ranging and sidelink communication between two end terminals, for example, as well as include the above designations.

Different SR-RS resource allocation options or aspects can be used in practical sidelink systems by a V/V2X device. For instance, SR-RS can be transmitted inside a designated sidelink channel and with an associated resource pool—sidelink ranging resource pool, as in the DMRS/SR-RS transmissions 1502, 1504, 1506 of FIG. 15.

Figure 16:
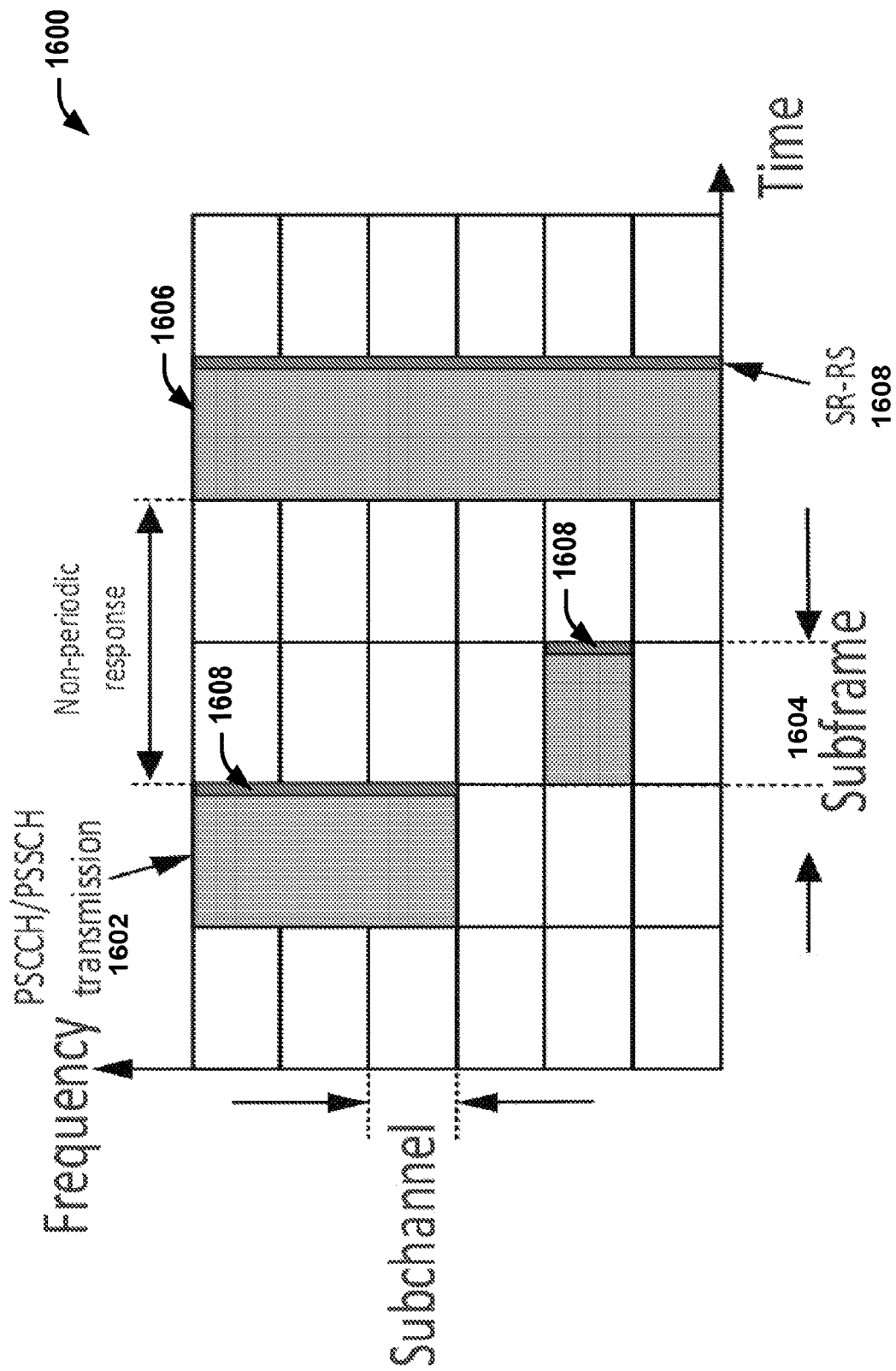
FIG. 16 is a diagram illustrating a sidelink PSSCH transmission with the last symbol of a subframe used as a sidelink ranging reference signal, according to various aspects discussed herein.

Additionally, or alternatively, the SR-RS transmission can be appended to the existing sidelink physical channels (e.g., a Physical Sidelink Control Channel (PSCCH), a Physical Sidelink Shared Channel (PSSCH), Physical Sidelink Discovery Channel (PSDCH), etc., as illustrated in the transmissions 1602, 1604, and 1606 of FIG. 16, as an example of time resources for SR-RS transmission.

Therefore, different design embodiments can be considered or generated for SR-RS transmission via a V/V2X node. In one embodiment, a V/V2X 602, 622 can re-use the existing sidelink physical channels/resource pools for SR-RS transmission (as a non-standalone operation) in LTE and NR. For example, SR-RS transmission 1602 can occur inside of sidelink resource pools (e.g. PSCCH/PSSCH/PSDCH). The SR-RS transmission 1602 can follow the same channel access rules as defined for the corresponding channel (e.g., PSCCH/PSSCH). For example, in application to LTE V2X technology, the SR-RS signal can be allocated at the last symbol of each subframe used by PSCCH/PSSCH channels, which is normally unused in LTE R14 because of the Tx-Rx/Rx-Tx switching gap considerations.

In another embodiment, a dedicated physical channel/resource pool can be generated for SR-RS transmission (as for standalone operation). In this case, SR-RS can be transmitted separately from PSCCH/PSSCH in designated sidelink resources, while the control signaling or control information data associated with ranging procedure can be carried through the existing sidelink channels. The potential drawback of this option is an increased implementation overhead for automatic gain control (AGC) settling time for SR-RS reception. In addition, ranging procedures can assume additional signaling of payload information that cannot necessarily be transferred simply through reference signals and therefore PSCCH/PSSCH transmission could occur anyway or regardless of generating the SR-RS in a dedicated physical channel/resource pool, and separate from associated payload/control information for ranging (e.g., geo-location information, signaling of resources or the like).

As also illustrated in FIGS. 15 and 16, is an example of the V/V2X 602, 622 generating the SR-RS as a partial band utilization with transmission 1602, a subframe or subchannel transmission 1604, or a full/entire/complete system bandwidth 1606 that can be transmitted as only one type of transmission 1602-1606 or different types, as consecutive/periodic use of resources (e.g., in each subframe or subchannel), interlaced, or non-consecutively and non-periodic, for example.

In another embodiment, the V/V2X 602, 622 can generate (or process) a dedicated physical channel for sidelink ranging (PSRCH), which can also have multiple technical advantages. One advantage is that ranging control information (resources discussed herein) can be carried jointly with SR-RS signals, in which the physical structure of PSRCH and the SR-RS can be optimized for ranging protocol, thereby potentially reducing system overhead and increasing ranging accuracy. One of the clear advantages for this option is that ranging payload (control) information can be carried together with ranging signals.

Other aspects or embodiments can be related to structuring/generating/processing of the time resources for the SR-RS transmissions as sidelink communications. As such, SR-RS transmissions can replace transmission of PSCCH/PSSCH/PSDCH on any OFDM symbol within a sidelink subframe 1604. The transmission of PSCCH/PSSCH/PSDCH corresponding to the position of the SR-RS signal can be either punctured or rate matched across SR-RS resource elements, for example, by the receiving node or V/V2X 602, 622. In order to take into account legacy UEs of LTE sidelink communication, the SR-RS transmission can be allocated to the last symbol of sidelink subframe and accommodate or be functional with such legacy devices by the last symbol 1608 (with SR-RS) of each sidelink subframe being punctured.

For identification of the node transmitting SR-RS (and to avoid blind detection of SR-RS), the mapping of SR-RS can depend on resources occupied by the transmission of a corresponding sidelink physical channel, assuming when SR-RS is configured with no additional information being carried as by SR-RS itself (e.g. PSDCH/PSDCH/PSSCH resource—e.g. resource index, start PRB, sub-channel index, etc.). In some embodiments, SR-RS can be configured with a time offset to introduce a time gap between PSCCH/PSSCH/PSDCH and SR-RS transmissions.

Figure 17:
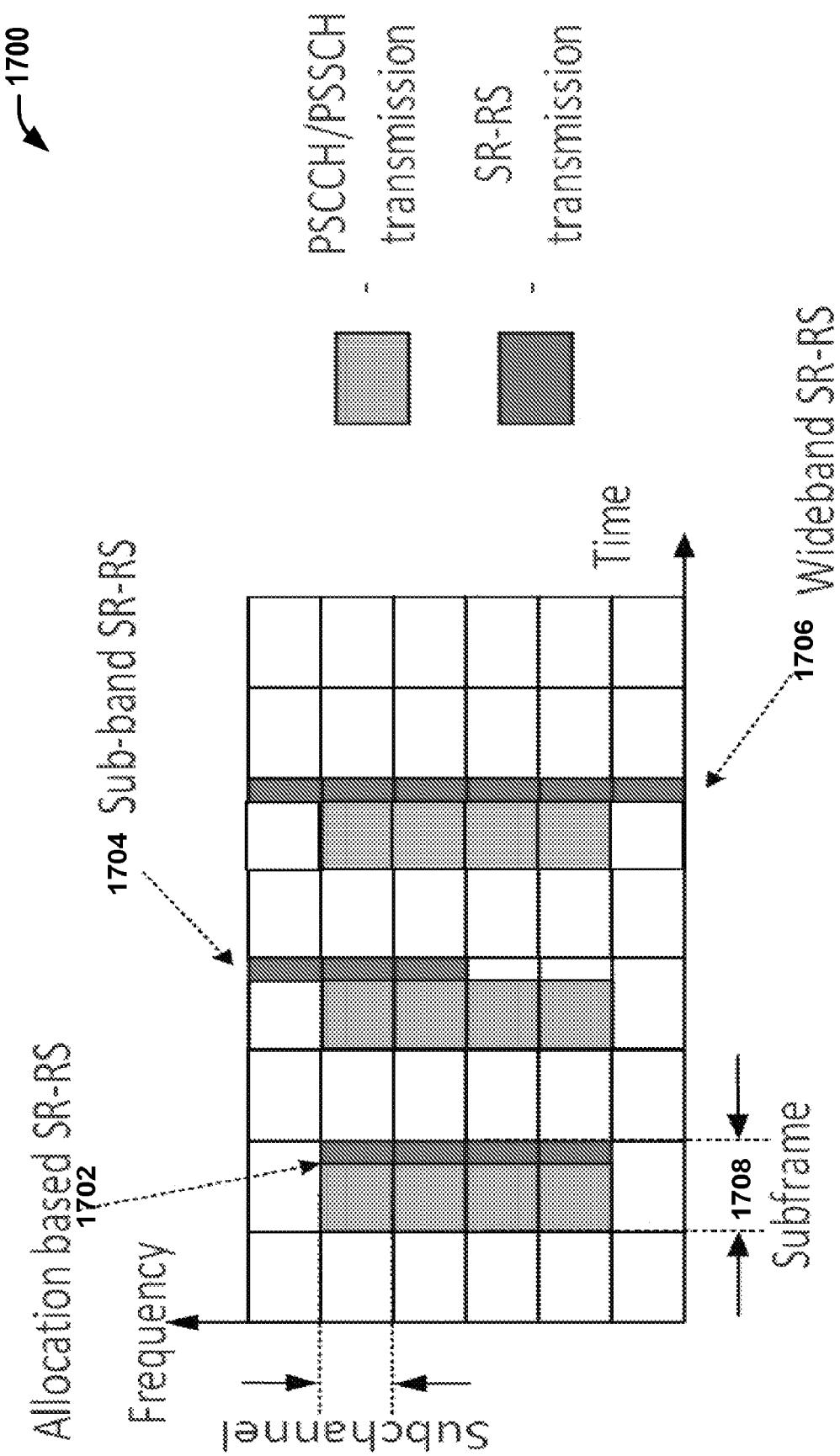
FIG. 17 is a diagram illustrating Sidelink Ranging Reference Signal (SR-RS), according to various aspects discussed herein.

Referring to FIG. 17, illustrated is an example of SR-RS frequency resources for SR-RS transmission in accordance with various aspects described herein. Depending on design, in various embodiments options 1702, 1704, and 1706, for example, can be used for allocation of SR-RS frequency resources. In order to have the same accuracy of SR-RS measurements (i.e., to have the same measurement errors between UEs in the system), each node or V/V2X can transmit SR-RS using the same signal bandwidth.

In various embodiments, different configurations can be used for generation/configuration/selection of SR-RS frequency resources. For example, SR-RS can be generated as a wideband SR-RS 1706, sub-band SR-RS 1704, or an allocation based SR-RS 1702.

When the V/V2X 602, 622 generates a wideband SR-RS 1706, the SR-RS transmission bandwidth is equal to the system bandwidth or the bandwidth allocated for sidelink resource pool of the particular sidelink physical channel, e.g., PSCCH/PSSCH/PSDCH (i.e. resource elements used for SR-RS transmission are distributed across whole/entire/full/complete system bandwidth/sidelink resource pool and can be equally spaced or uniformly distributed across frequency).

When the V/V2X 602, 622 generates sub-band SR-RS 1704, only part of available sidelink frequency resources could be used for SR-RS transmission (e.g. one or multiple frequency sub-channels). The specific set of REs or PRBs for SR-RS transmission is a function of UE-specific transmission parameters (e.g., UE ID, priority, sidelink resource index such as PSCCH resource index, start PRB of PSSCH, etc.). For sub-band based SR-RS transmission, additional hopping (e.g., frequency hopping) can be used (e.g., particular sub-bands for SR-RS transmission may change from one SR-RS transmission instance or subframe to another such as with at least one of a fixed period P, offset in frequency K, or number of adjacent PRBs as N in number, where N is an integer of at least one or more subframes 1708, slots, frames, or the like.

When the V/V2X 602, 622 generates an allocation based SR-RS 1702 SR-RS transmission bandwidth is determined by the bandwidth of the selected resource for actual PSCCH/PSSCH/PSDCH transmission (e.g. UE specific resource allocation for shared channel transmission).

For an SR-RS resource set being configured, processed or generated by a node, a set of resources can be used by the V/V2X 602, 622 for transmission of SR-RS signal in one or multiple OFDM symbols allocated within a frame, a subframe or a slot. In response to code-division multiplexing being used for SR-RS transmission, the spreading code (orthogonal cover code) corresponding of the particular SR-RS sequence can be also a part of SR-RS resource set.

In an aspect, a number of SR-RS resource sets could be equal to or larger than a number of UEs that can be multiplexed in a same subframe or amount of frequency sub-channels (as the frequency granularity) used for sidelink transmission For LTE sidelink configuration by the V/V2X 602, 622, SR-RS can be allocated within the last symbol of each subframe, but embodiments herein are not limited to this aspect alone and other options can be envisioned or configured by a terminal/node as well.

Figure 18:
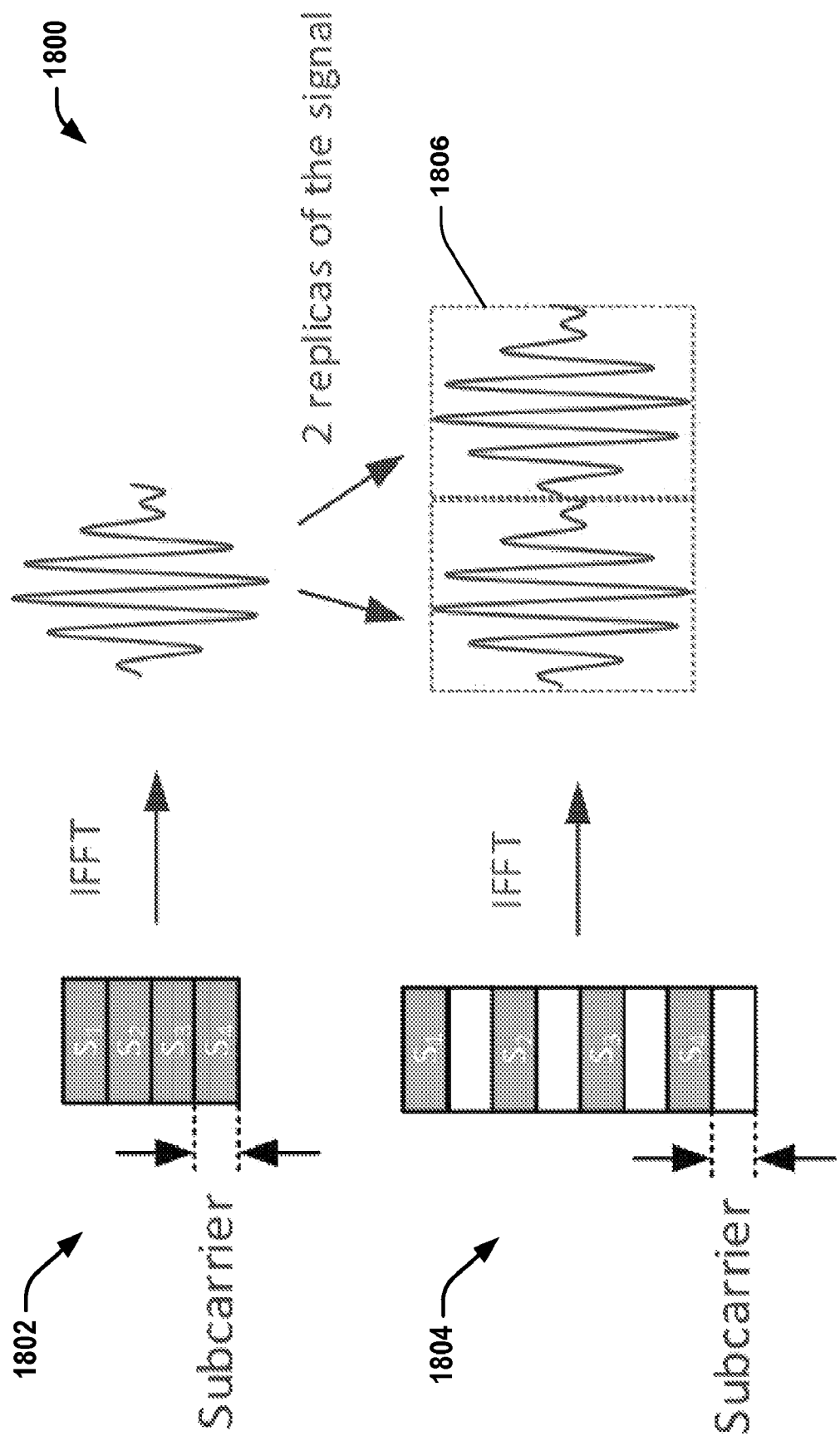
FIG. 18 is a diagram illustrating a time domain signal repetition for zero-padded signal in frequency, according to various aspects discussed herein.

Referring to FIG. 18, illustrated is an example of subcarrier spacing configurations for SR-RS. In further embodiments, the subcarrier spacing considerations can take into account resource selection such as resource element selection, for example. The SR-RS signal can be processed or generated according to a distinct numerology apart from others. For example, an increased numerology could be configured (e.g., an increased subcarrier spacing from 15 kHz to 30, 60, 120, 240 kHz, etc.) by the V/V2X 602, 622 that shortens the SR-RS symbol duration. SR-RS transmission can occupy an entire symbol in a reference numerology of other sidelink channels, or occupy just a part of it. SR-RS 1802 is transmitted using reference numerology (e.g. 15 kHz subcarrier spacing or any other value) at each resource element.

SR-RS 1806 can be transmitted with a reference numerology or an indication thereof on a subset of resource elements 1804. For example, the SR-RS signal set 1804 could occupy each N-th (N 1) subcarrier (non-occupied subcarriers are nulled out) and thus be repeated N times on the reference symbol duration. The SR-RS 1806 signal is transmitted with distinct numerology (e.g. increased subcarrier spacing). In this case, SR-RS 1806 occupies only part of the reference symbol duration. Increased subcarrier spacing leads to reduced OFDM symbol duration, if the same signal bandwidth is preserved. In this option, it is possible to fit two 30 kHz OFDM symbols or four 60 kHz OFDM symbols into one 15 kHz OFDM symbol (e.g., as replicas of the signal).

Figure 19:
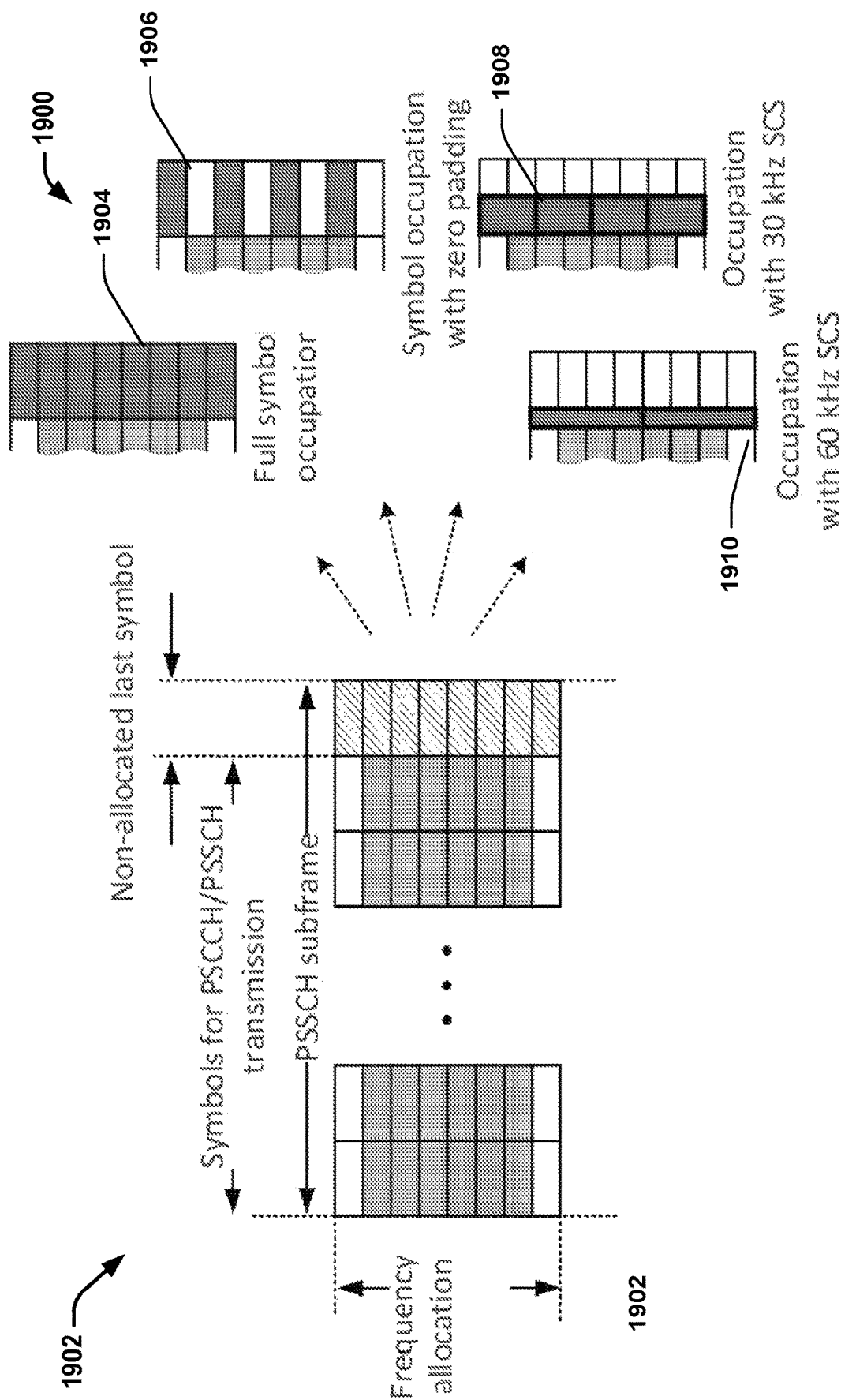
FIG. 19 is a diagram illustrating SR-RS physical structure options, according to various aspects discussed herein.

Referring to FIG. 19, illustrated are further examples of SR-RS physical structure configurations 1900, which can be representative of the last symbol for PSCCH/PSSCH transmission 1902 along a subframe (e.g., a PSSCH subframe or other channel). The last symbol, which is normally a non-allocated last symbol, can be used for SR-RS as occupying a full symbol 1904, occupying the entire/whole/full/complete system bandwidth and time. In another aspect, the SR-RS 1906 can occupy each N-th (N≥1) subcarrier where the non-occupied subcarriers are nulled out, and thus repeated N times on the reference symbol duration for SR-RS transmission.

In other aspects, the SR-RS signals 1908, 1910 can be transmitted with the distinct numerology (e.g. increased subcarrier spacing) from other sidelink signals of other sidelink channels. For example, SR-RS 1908 and 1910, for example, could occupy only a part of the reference symbol duration. Increased subcarrier spacing leads to reduced OFDM symbol duration, if the same signal bandwidth is preserved. Similar to the description related to FIG. 18 above, for example, SR-RS 1908 can be configured to fit two 30 kHz OFDM symbols, or SR-RS can be configured with four 60 kHz OFDM symbols into one 15 kHz OFDM symbol, for example, (as replicas of the signal).

Figure 20:
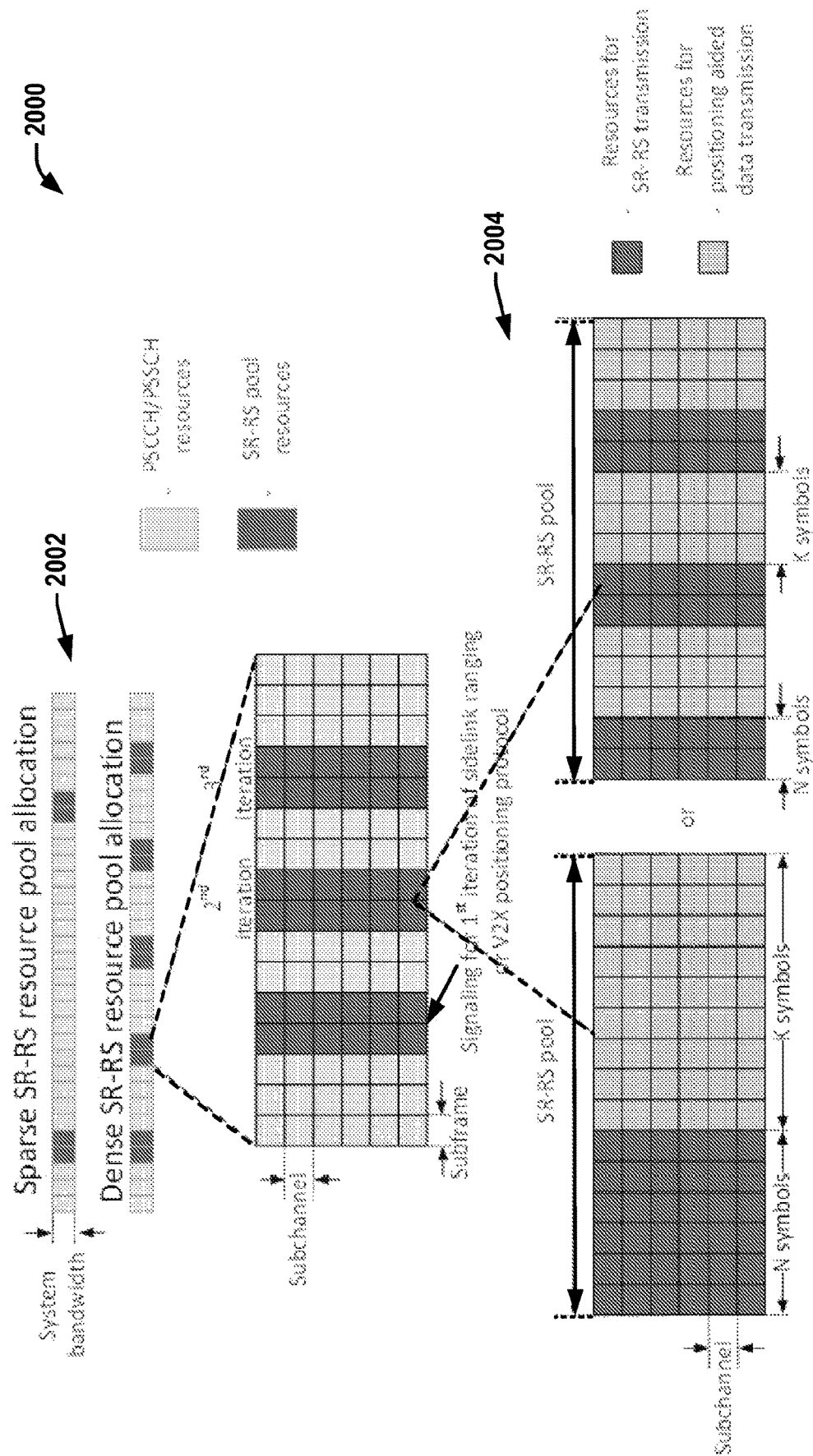
FIG. 20 is a diagram illustrating SR-RS resource pool configuration inside sidelink resources, according to various aspects discussed herein.

Referring to FIG. 20, illustrated is an example of SR-RS resource pool configuration(s) inside of sidelink resources. A dedicated resource pool can include allocation of system specific physical resources for SR-RS signal transmission by UEs (e.g., V/V2X 602, 620), as so-called SR-RS resource pool (sidelink ranging reference signal pool).

The SR-RS pool can be dynamically generated as flexible to support different types of system requirements based on the resource parameters or geo-location-position information ascertained from the network environment. The physical structure of the SR-RS pool could efficiently support two way ranging protocols and iterative nature of cooperative positioning algorithms to track vehicles coordinates. It is desirable to support periodical allocation of SR-RS pool in time with period $P_{SR-RS}$. The period of the SR-RS pool could not exceed (be equal to or below) a maximum time for coordinate update required by V2X applications and can be configurable by the V/V2X node, for example, to initiate or configure sidelink communications via SR-RS for ranging and positioning.

Inside each SR-RS pool period, nodes (e.g., a V/V2X 602, 622) select SR-RS resources for transmission. Depending on design option the selection of SR-RS resource may follow different rules.

V2X positioning/ranging procedures rely on SR-RS transmission that is used for measurements of signal location parameters (ranging) and exchange of control information (e.g. set of signal location parameter measurements for nearby UEs to further estimate UE location). The control information can be carried through sidelink channels PSCCH/PSSCH/PSDCH, etc. In this case, a number of SR-RS resources could be configured to be proportional to the number of PSCCH/PSSCH/PSDCH transmission occasions on a given period of time.

SR-RS resource pools at view 2002 can be positioned within a sidelink resources (e.g., PSCCH, or PSSCH) with different density of sparsity from sparse to more concentrated. In one example, at each iteration, SR-RS pool resources include different iterations. At each iteration, in a closer-up view, SR-RS pool resources 2004 can be seen as resources for SR-RS transmission and also resources for positioning aid in transmission.

Time resources assigned to the SR-RS pool 2000 can also be defined by different embodiments. In one embodiment, a bitmap configuration of time resources assigned to the SR-RS pool (bitmap over symbols, slots, subframes or frames, etc.) indicating time resources can be used by the V/V2X 602, 622 for the generation or processing of SR-RS. The bitmap can be either contiguously and cyclically repeated or repeated within a predefined period.

In another embodiment, the SR-RS pool 2000 could be defined by equations that depend on system parameters pointing to symbol/slot/subframe/frame index/system frame number, where resources for SR-RS transmission are allocated.

In another embodiment, the SR-RS pool 2000 could be defined by a periodical set of time resources configured by a time offset, a period and a duration (number of time resources assigned to SR-RS pool per period), where resource can be represented by symbol, slot, subframe, etc. One design configuration example is to allocate the last symbol of each V2V/V2X subframe for the SR-RS pool.

Referring to FIG. 21, illustrated are different examples of allocation of the SR-RS resource pool 2100 (separate from the PSCCH/PSCCH resource pools). Frequency resources allocated for SR-RS pool 2100 can be configured by different embodiments or options.

For example, a full system bandwidth can be allocated for the SR-RS pool, as with the top-most configurations being illustrated. This could be useful to achieve a maximum measurement accuracy at least for time of arrival (TOA) measurements or other signal location parameters. As another options, a bitmap configuration, indicating PRBs/frequency sub-channels assigned to SR-RS pool can be signaled or used for processing of the SR-RS. Alternative, or additionally, the resources can include indexing of start PRB, end PRB or start PRB and number of PRBs to indicate the SR-RS pool bandwidth.

Once resources for SR-RS pool are allocated, a node (e.g., V/V2X 602, 622) selects resources for SR-RS transmission. Different aspects can be defined for SR-RS resource selection. Additional factors that could be considered for SR-RS resource selection are UE specific parameters such as velocity value and vector (travel direction), V2X application priority, etc., to be accounted for in configuring the SR-RS transmission by the V/V2X node, which can be indicated or derived from geo-location information as part of sidelink signaling for ranging and resource management/communication operations discussed herein.

In one example, a single SR-RS transmission does not require allocation of the whole subframe (only a subset of symbols that can be used). Therefore, the SR-RS pool can comprise multiple symbols distributed in time over predefined interval (SR-RS pool) and repeated in time with SR-RS pool period, as shown in the bottom-most configuration examples of example configurations 2100. In addition, only a subset of resource elements within OFDM symbol could be allocated to form the SR-RS resource set.

Other aspects could be also used by a UE (V/V2X 602, 622) for SR-RS resource selection procedure. For example, a random resource selection could be utilized. The UE V/V2X 602, 622 can randomly select an SR-RS resource set (e.g. N time resources—symbols) from K available, where K is the total number of SR-RS sets available for SR-RS transmission within SR-RS pool, where N is less than or equal to K (N<=K).

In another aspect, alternatively or additionally, V/V2X 602, 622 for SR-RS resource selection procedures can utilize a deterministic resource selection. The SR-RS set for UE transmission can be determined by an equation, which can be a function of UE-specific parameters like a Radio Network Temporary Identifier (RNTI), a priority, a resource or a resource index used for transmission in other sidelink channels, a time instance (subframe/slot/symbol), velocity (vector and magnitude), acceleration, etc.

In another aspect, alternatively or additionally, V/V2X 602, 622 for SR-RS resource selection procedures can utilize a sidelink channel sensing operation. The SR-RS set of resources selection may be dependent on a sensing and resource selection procedure applied for sidelink resource selection in other channels e.g. PSCCH, PSSCH or PSDCH resources. For example, in response to a sensing procedure being applied for PSCCH/PSSCH resource selection, then the sensing results can be used for SR-RS resource set selection. In the latter case, the association of PSCCH/PSSCH resources and SR-RS resource sets can be used. For instance, in application to LTE-V2V technology, the UE V/V2X 602, 622 can select a PSCCH and PSSCH resource.

In other aspects, alternatively or additionally, the V/V2X 602, 622 for SR-RS resource selection procedures can select resources or a subset of resources based on the sensing procedure. One simple approach in this case is to transmit SR-RS in the same subframe as used for PSCCH/PSSCH transmission and use resources (resource elements) of non-occupied last symbol of subframe.

In other aspects, alternatively or additionally, the V/V2X 602, 622 for SR-RS resource selection procedures can utilize SR-RS sensing. For example, a dedicated sensing procedure can be used solely for SR-RS transmission, and not for other sidelink communications. In particular, assuming that SR-RS pool is periodically allocated, the V/V2X as a UE, for example, can measure received power on each SR-RS resource set within SR-RS pool period and select the one with minimum received power or randomly select from candidate resource set with lowest received energy.

In another aspect, alternatively or additionally, the V/V2X 602, 622 for SR-RS resource selection procedures can utilize a geo-based approach. Given that V2V systems are sensitive to in-band emissions (IBE), the geo-location based approach could be a method to select time instance for SR-RS transmission. All available time resources are divided on orthogonal (or sub-orthogonal) sets and each geo zone is associated with at least one set, as described herein.

Alternatively or additionally, the V/V2X 602, 622 for SR-RS resource selection procedures can utilize a scheduling based approach. The SR-RS resource set for transmission can be assigned/signaled by another node (e.g. RSU, eNB/gNB, vehicle, as another V2X, etc.). In practical systems, any combination of listed above approaches can be enabled and applied for specific use case based on one or more parameters, sensed resources, geolocation information, or otherwise.

Figure 22:
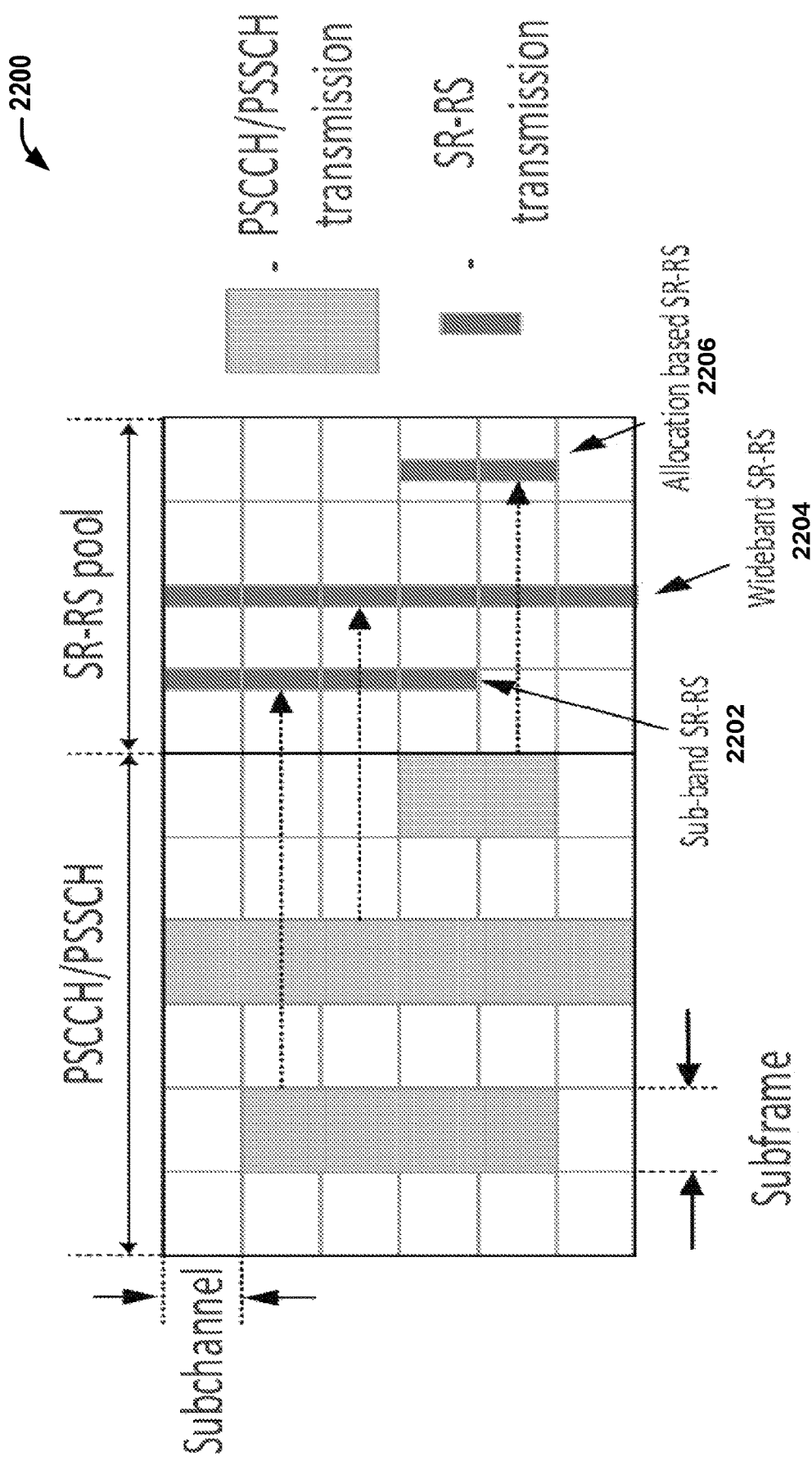
FIG. 22 is a diagram illustrating SR-RS resource selection based on PSCCH/PSSCH resource selection/transmission, according to various aspects discussed herein.

Referring to FIG. 22, illustrated is an example of SR-RS resource selection 2200 based on PSCCH/PSSCH resource selection/transmission. A sub-band SR-RS 2202, a wideband SR-RS 2204, or allocation based SR-RS 2206 can be examples that are chosen based on or according to a resources in the PSCCH/PSSCH resource selection/transmission, for example.

SR-RS resource set inside the SR-RS pool can be associated with sidelink resources of other sidelink channels, e.g. PSCCH/PSSCH resources. The mapping of PSCCH/PSSCH transmission resources into SR-RS transmission resources may depend on PSCCH/PSSCH resource allocation granularity (number of physical resource blocks (PRBs), time transmission intervals (TTIs)), etc., since the latter can determine the amount of resources available for PSCCH/PSSCH transmission. Alternatively, or additionally, a fixed amount of SR-RS resource sets can be defined per SR-RS pool period.

Figure 23:
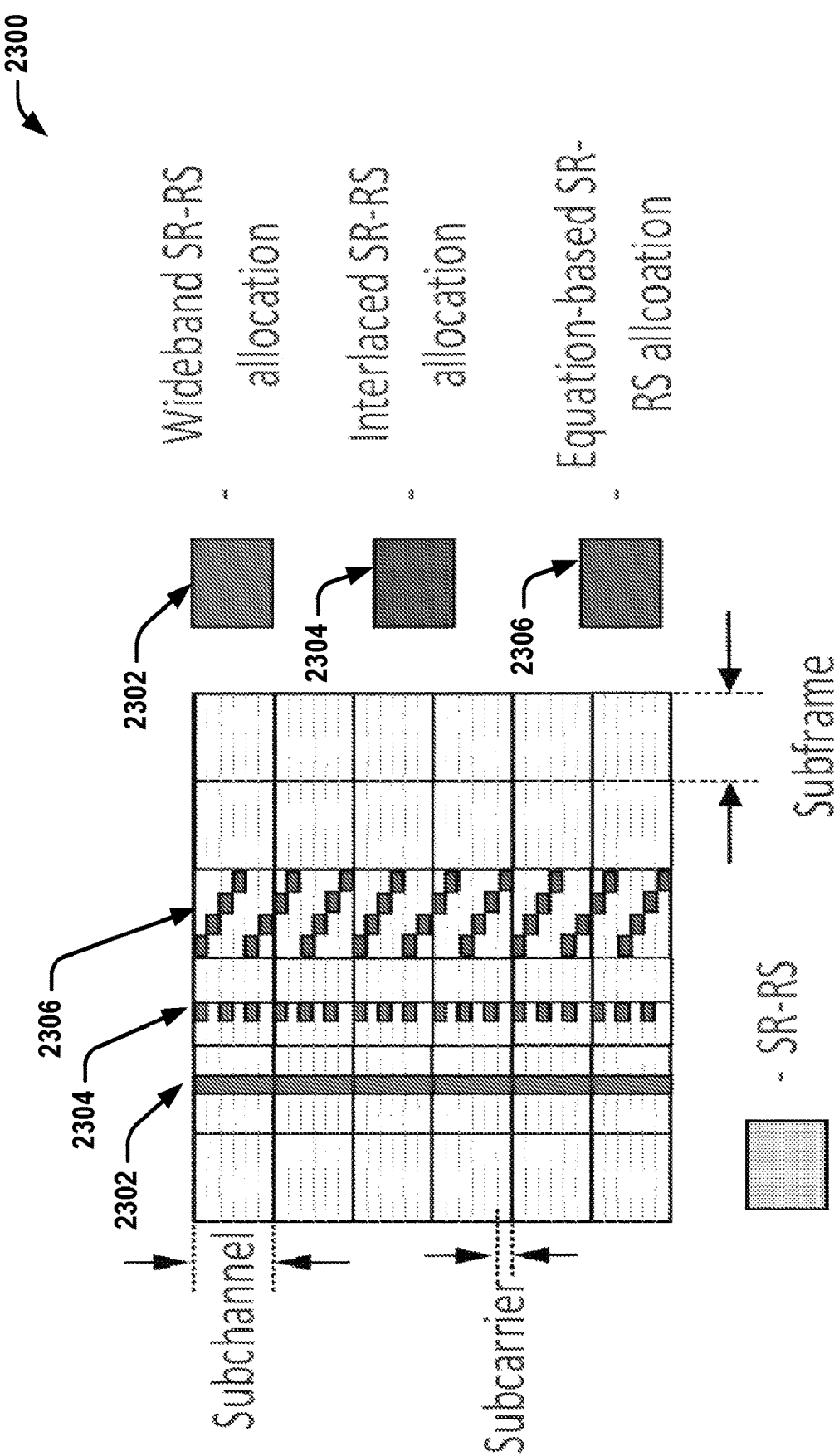
FIG. 23 is a diagram illustrating resource selection for SR-RS mapping, according to various aspects discussed herein.

Although the PSCCH/PSSCH transmission can occupy only part of the system bandwidth, it does not necessarily limit the bandwidth of SR-RS transmission for which various design options can be considered for SR-RS tone allocation. FIG. 23 illustrates different examples of resources selection for SR-RS mapping.

For example, in a wideband SR-RS allocation 2302, a full system bandwidth can be occupied by a single SR-RS transmission. Subcarrier spacing for the SR-RS transmission could differ from the one used for other sidelink channels. The latter can be beneficial in order to multiplex in time or using code division multiplexing transmissions from different UEs.

In another example, tones can be distributed in a frequency SR-RS allocation 2304. In this case, frequency division multiplexing can be used by the V/V2X 602, 622, for example. For instance, SR-RS can be mapped into each K-th available subcarrier in order to reduce SR-RS collision and amount of SR-RS interference from different nodes in the same SR-RS resource set, as an interlaced allocation.

In other embodiments instead of using equally spaced tone allocation 2306 to SR-RS set a specific equation can be used to derive indexes of REs for the SR-RS set that may depend on a symbol counter, UE-specific parameters UE ID, RNTI, priority, resource used for sidelink transmission, etc.

Figure 24:
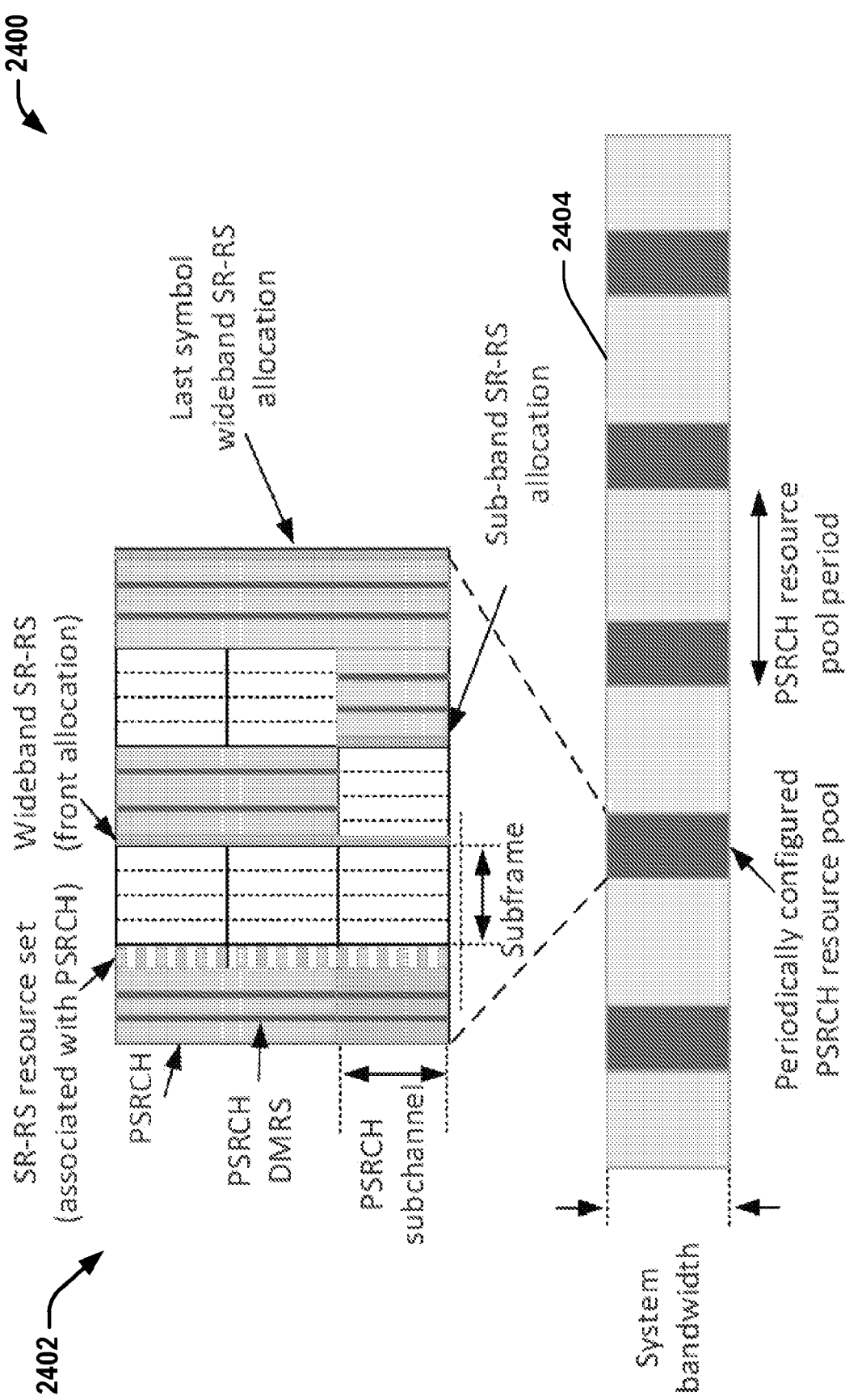
FIG. 24 is a diagram illustrating an example of a physical channel for sidelink ranging (PSRCH) and SR-RS physical structure, according to various aspects discussed herein.

Referring to FIG. 24, illustrated is an example of a dedicated sidelink ranging channel (PSRCH) 2400 in accordance with various aspects or embodiments herein.

The physical sidelink ranging channel (PSRCH) design can be introduced to combine transmission 2404 of SR-RS with transmission of ranging payload (ranging information) 2402. This assumes a dedicated physical structure and optimized design for SR-RS and PSRCH transmission. The dedicated pool of sidelink resources can be allocated for PSRCH transmissions by a V2X node to a vehicle or V2X node. The SR-RS signal can serve as a demodulation reference signal for PSRCH or separate DMRS signals can be used PSRCH demodulation.

The PSRCH/SR-RS sidelink resource pool can be periodically configured in time, or dynamically re-configured based on changes in parameters or geo location information, for example. The resource configuration signaling can be similar to SR-RS pool configuration as referred to in FIG. 20, for example, and can be used to indicate time and frequency resources available for PSRCH/SR-RS transmission by V/V2X devices as a UE or eNB/gNB. The PSRCH resource can be linked with a SR-RS resource set. The PSRCH and SR-RS may have different physical structure and mapping to resource elements. For SR-RS transmission, the wideband transmission is desirable while PSRCH may have sub-band (UE can occupy several sub-bands) or wideband allocation. In both cases of sub-band and wideband allocation PSRCH and SR-RS can be multiplexed in time. The SR-RS resource sets can be also multiplexed in frequency and its physical structure can be similar to the ones described earlier herein.

Additionally the SR-RS set associated with the PSRCH can be interlaced, at the front symbol, last symbol or otherwise configured in one or more different configurations throughout the PSRCH resource pool 2402 of an SR-RS transmission 2404, for example.

The PSRCH channel may have one or more formats in order to signal ranging information/geo-location information for one or more V/V2Xs or UEs. The format of PSRCH can be indicated through demodulation reference signals, otherwise a fixed format can be used.

Regarding PSRCH and SR-RS resource selection, similar aspects, embodiments, principles of operation as described above can also be used for PSRCH/SR-RS transmission, including: Random Resource Selection, where the UE randomly selects PSRCH/SR-RS resources from a corresponding sidelink resource pool; Deterministic Resource Selection, where the UE determines PSRCH/SR-RS resource as a function of UE-specific parameters like RNTI, priority, resource or resource index used for transmission in other sidelink channels, velocity (vector and magnitude), acceleration, time instance, etc.; Sidelink Channel Sensing, where PSRCH/SR-RS resources selection may be dependent on sensing and resource selection procedure applied for sidelink resource selection in other channels (e.g. PSCCH, PSSCH or PSDCH resources) as the association between PSRCH and other channel resources can be made; PSRCH Sensing, where a dedicated sensing procedure can be defined solely for PSRCH/SR-RS transmission. For PSRCH sensing, in particular assuming that PSRCH/SR-RS pool is periodically allocated, the V/V2X UE can measure received power on each PSRCH/SR-RS resource within pool period and select the one with minimum received power or randomly select from candidate resources with lowest received energy. Other embodiments, include a geo-based approach, where given that V2V systems are sensitive to IBE, the geo-location based approach could be a method to select resources for PSRCH/SR-RS transmission. Additionally, or alternatively, a scheduling based approach can be used where the PSRCH/SR-RS resource for UE transmission can be assigned/signaled by another node (e.g. RSU, eNB/gNB, vehicle, etc.).

For ranging, the receiver should be able to extract information about actual source of the received SR-RS signal or at least properly map SR-RS transmission with other sidelink channel transmission. Various mechanisms can be used to provide information about SR-RS source to detect the SR-RS source UE.

For example, an explicit or implicit signaling in PSCCH (e.g. additional field in PSCCH) can be utilized. The SCI can be extended in order to contain SR-RS mapping information for particular UE. Sidelink Control Information (SCI) can contain information about the UE (ID, RNTI, etc.). The PSCCH resource can then be associated with SR-RS resource set.

In another aspect, an explicit or implicit signaling in PSSCH (e.g. additional MAC CE/header or RRC signaling) can be performed where the PSSCH payload may include information about the SR-RS resource set or PSSCH resource (e.g. a start PRB) can be associated with SR-RS resource set.

In a further aspect, explicit or implicit signaling in PSRCH can be jointly with SR-RS. A specific channel (PSRCH) with predefined physical structure can be defined to carry all ranging control information and associated SR-RS signals.

In yet another aspect, explicit or implicit signaling by SR-RS can be performed where the SR-RS may carry at least partial information about a source ID.

Figure 25:
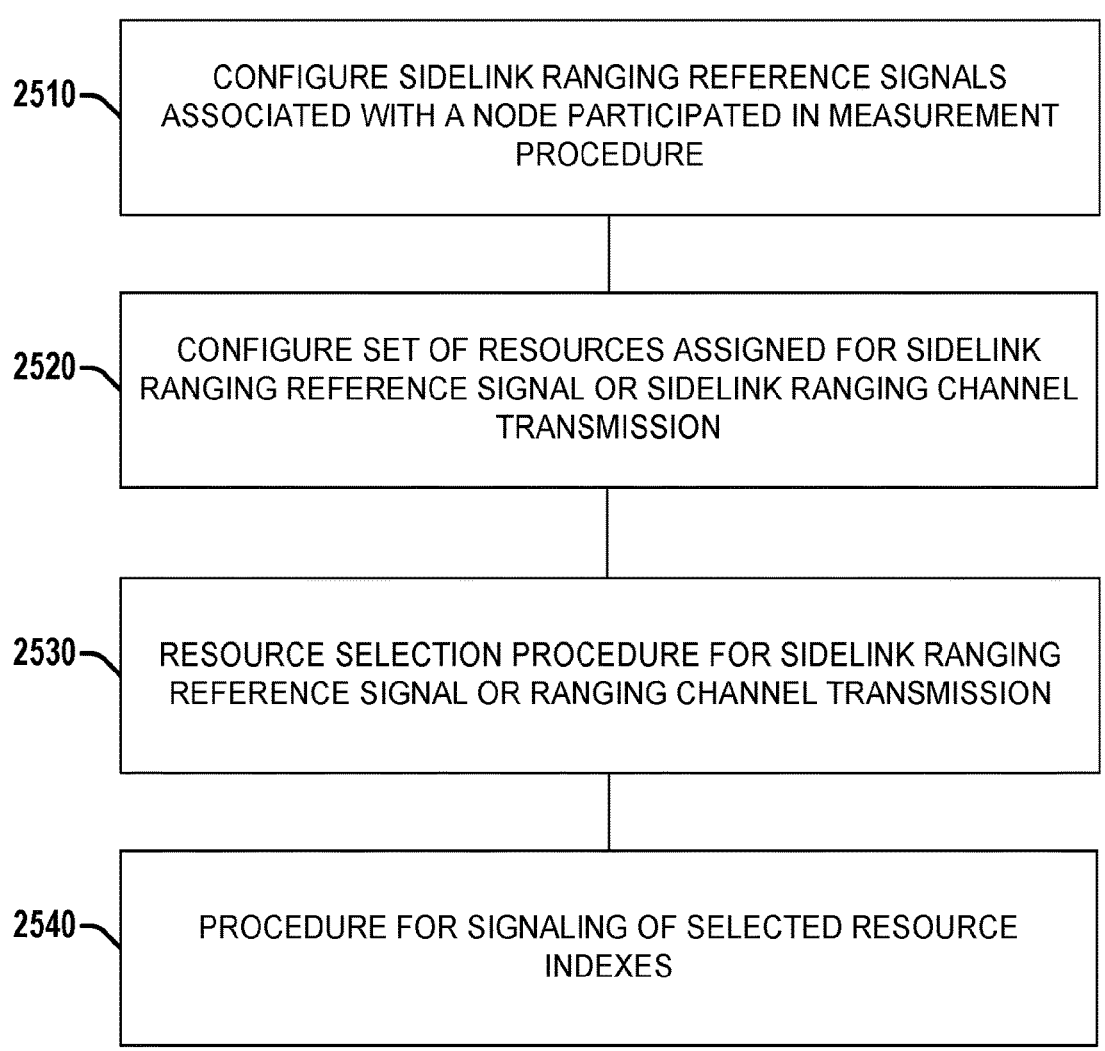
FIG. 25 is a flow diagram of an example method employable at a V/V2X for measuring location parameters (geo-location information) based on a sidelink ranging, according to various aspects described herein, according to various aspects discussed herein.

Referring to FIG. 25, illustrated is a method 2500 for signaling sidelink communications for ranging and geo-location/ranging information at a V/V2X device as a UE, eNB, gNB or the like for communication on an LTE and NR network. The method 2500 is for measuring signal location parameters based on sidelink ranging procedure between vehicles or between vehicle and infrastructure nodes to enable accurate vehicle positioning through sidelink communication and sidelink ranging protocols. method 2500 initiates at 2510 with configuring sidelink ranging reference signals associated with a node participated in measurement procedure.

At 2520, the method further comprises configuring a set of resources assigned for sidelink ranging reference signal or sidelink ranging channel transmission.

At 2530, the method includes resource selection procedure for sidelink ranging reference signal or ranging channel transmission.

At 2540, the method includes a procedure for signaling of selected resource indexes.

In other embodiments, the sidelink ranging reference signals is a DMRS from sidelink shared channel used for measurement of signal location parameters and ranging procedure.

Alternatively, or additionally, the Sidelink Ranging Reference Signal (SR-RS) is a dedicated reference signal designed for measurement of signal location parameters and sidelink ranging procedures.

In another aspect, a dedicated sidelink ranging physical channel—Physical Sidelink Ranging Chanel (PSRCH) is used for a measurement procedure.

Alternatively, or additionally, a dedicated sidelink ranging reference signal is transmitted in the last symbol of each subframe used for PSCCH/PSSCH/PSDCH.

Alternatively, or additionally, a dedicated sidelink ranging reference signal is transmitted inside dedicated resources pool for SR-RS.

In another aspect, the SR-RS transmission bandwidth can be equal to the system bandwidth or the bandwidth allocated for sidelink resource pool, occupy only a part of system bandwidth or the bandwidth allocated for sidelink resource pool, or be equal to a bandwidth of the selected resource for actual PSCCH/PSSCH/PSDCH transmission.

The sidelink ranging reference signals can be generated as orthogonal or quasi-orthogonal to each other. Orthogonalization between the reference signals can be obtained by: a code division multiplexing with different cyclic shifts; spreading with orthogonal cover code corresponding of the particular SR-RS sequence; frequency division multiplexing; or a time division multiplexing. The sidelink ranging reference signals can be transmitted using a reference numerology used for other channel transmissions, in a subset of resource elements allocated for SR-RS transmission using the reference numerology, or transmitted with a distinct numerology other than reference numerology of PSCCH/PSSCH/PSDCH physical channels inside all resource elements allocated for SR-RS transmission, or transmitted with distinct numerology than numerology of PSCCH/PSSCH/PSDCH physical channel in a subset of resource elements allocated for SR-RS transmission.

The resource pool of time resources can be defined by or signaled as: a bitmap configuration; an equation that depends on system parameters like symbol/slot/subframe/frame index/system frame number. A periodical set of time resources configured by time offset, period and duration, where resource can be represented by symbol, or slot, or subframe.

The frequency resource indication can be defined by: a full system bandwidth allocated for sidelink; a bitmap configuration; or an indexing of start PRB, end PRB or start PRB and number of PRBs. A resource for SR-RS transmission can be defined according to resource selection rule.

The following options or combination of options can be used for SR-RS transmission resource selection: a random selection of N resources from K available candidates, $N<=K$, or a transmission resource is determined by a function of UE-specific parameters like RNTI, priority, resource or resource index used for transmission in other sidelink channels, time instance (subframe/slot/symbol), velocity (vector and magnitude), acceleration.

The SR-RS resource selection can alternatively or additionally be dependent on sensing and resource selection procedure. This procedure can be applied for sidelink resource selection in other channels e.g. PSCCH, PSSCH or PSDCH resources. It can be a dedicated sensing procedure defined for SR-RS transmission, or a SR-RS resource set for transmission can be assigned/signaled by another node (e.g. RSU, eNB/gNB, vehicle, etc.).

The sensing results for PSCCH/PSSCH resources can be used for SR-RS resource set selection through the association of and SR-RS resource sets with PSCCH/PSSCH resources.

The SR-RS pool can be periodically allocated, where the UE measures received power on each SR-RS resource set within SR-RS pool period and selects the one with minimum received power or randomly selects from candidate resource set with lowest received energy.

The UE geo-location information can be used to select resource set for SR-RS transmission, wherein all available time resources are divided on orthogonal (or sub-orthogonal) sets and each geo zone is associated with at least one set of resources among different sets.

The SR-RS transmission allocates subcarriers according to following options: a full band allocation; an interlaced subcarrier allocation with equal spacing or permutation; or a specific set of subcarriers is defined, according to equation that is based on symbol counter, UE-specific parameters UE ID, RNTI, priority, resources used for sidelink PSCCH/PSSCH transmission.

Additionally, or alternatively, a dedicated physical ranging channel carries ranging control information and SR-RS.

Figure 26:
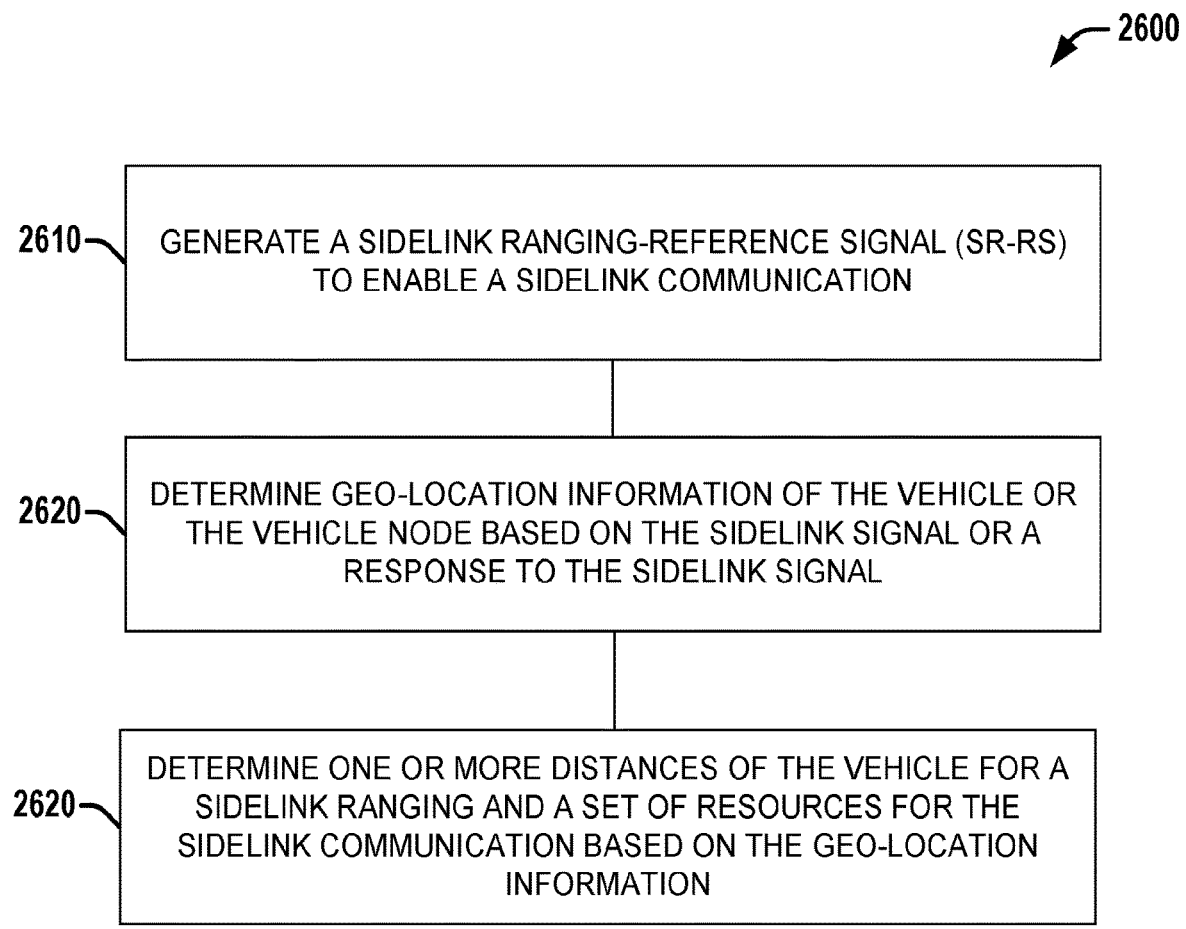
FIG. 26 is another flow diagram of an example method employable at a V/V2X for measuring location parameters (geo-location information) for a sidelink ranging, according to various aspects described herein, according to various aspects discussed herein.

Resources allocated for SR-RS transmission can be signaled via: explicit/implicit signaling in PSCCH (e.g. with an additional field in PSCCH); explicit/implicit signaling in PSSCH (e.g. with an additional MAC CE/header or RRC signaling); explicit/implicit signaling in PSRCH jointly with SR-RS; or explicit/implicit signaling by SR-RS Referring to FIG. 26, illustrated is a process flow 2600 for a V/V2X device to support a sidelink communication with a vehicle or a vehicle node. The method 2600 initiates at 2602 with generating a Sidelink Ranging-Reference Signal (SR-RS) to enable a sidelink communication. At 2604, the method includes determining geo-location information of the vehicle or the vehicle node based on the sidelink signal or a response to the sidelink signal. At 2606, the method includes determining one or more distances of the vehicle for a sidelink ranging and a set of resources for the sidelink communication based on the geo-location information.

The method can also include, among other acts or processes described herein, transmitting, or receiving, a broadcast communication of the sidelink signal via an adaptive antenna array or a directional antenna array, and forming a directional radiation pattern from a beam sweeping operation based on the geo-location information in a Long Term Evolution (LTE) network or a New Radio (NR) network.

The method can also include dividing or causing to divide time resources of the set of resources on orthogonal or sub-orthogonal sets and associating geo zones with different sets of time resources of the time resources; determining a geographical location or a coordinate position of the vehicle or the vehicle node based on the geo-location information; and associating one or more resources of the set of resources to sidelink communications with the vehicle or the vehicle node based on a geo-location area that the geographical location is within.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

In one example, an apparatus of a V2X device in a vehicle communication network, can comprise processing circuitry configured to: generate, or process, a sidelink signal of a sidelink communication with a V2X node that comprises a new radio NodeB (gNB), an eNodeB (eNB), a user equipment (UE), a Roadside Unit (RSU), a drone, or other vehicle device; determine geo-location information of the V2X node based on the sidelink signal between the V2X device and the V2X node; and derive a distance or positioning data of the V2X node based on a sidelink ranging and a set of sidelink resources based on the geo-location information for sidelink communications associated with the V2X node; a radio frequency (RF) interface, configured to receive from the processing circuitry, data for a transmission of the sidelink signal.

Another example can include the subject matter of any of the above examples further comprising: RF circuitry; wherein the RF circuitry comprises an adaptive antenna array or a directional antenna array configured to transmit, or receive, a broadcast, groupcast or unicast communication of the sidelink signal with the V2X node to form a directional radiation pattern from a beam sweeping operation based on the geo-location information in a Long Term Evolution (LTE) network or a New Radio (NR) network, wherein the processing circuitry is further configured to apply a beam selection based on the geo-location information to the transmission of the data at a transmitter, a reception of data at a receiver, or at both a transmitter and the receiver.

Another example can include the subject matter of any of the above examples, wherein the processing circuitry is further configured to: generate, or process, a synchronous sidelink communication of the sidelink signal that enables a synchronization of the set of sidelink resources for the sidelink communications; generate a determination a transmission timing and a frequency between the V2X device and the V2X node or between different V2X nodes based on the synchronous sidelink communication of the sidelink signal; and align the sidelink communications based on the transmission timing and the frequency.

Another example can include the subject matter of any of the above examples, wherein the processing circuitry is further configured to determine a synchronization in a time and a frequency to align the sidelink communications and determine symbol boundaries to enable a synchronization operation between the V2X device and the V2X node, or the different V2X nodes, with a timing error within a cyclic prefix (CP) duration of sidelink symbols.

Another example can include the subject matter of any of the above examples, wherein the processing circuitry is further configured to: determine a geographical location or a position of the V2X node based on the geo-location information signaled in sidelink signals or acquired from an external source comprising a Global Network Satellite System (GNSS); associate one or more sidelink resources of the set of sidelink resources to the sidelink communications with the V2X node based on a geo-location area that the geographical location is within.

Another example can include the subject matter of any of the above examples, wherein the processing circuitry is further configured to: derive the one or more sidelink resources based on one or more coordinates of the geographical location, or a derivative of the geo-location information comprising a velocity vector; wherein the set of sidelink resources comprise at least one of: a time resource index, a time interval, a frequency resource index, a frequency range, a beam index, a coding index, an analog or digital spatial pre-coding (beam/port), a code spreading, a set of user equipment (UE) specific parameters, a set of system parameters, or a set of location parameters.

Another example can include the subject matter of any of the above examples, wherein the RF circuitry is configured to: select the set of sidelink resources for transmission via a collocated antenna array or a distributed antenna array based on the geo-location information; derive a selection of the one or more sidelink resources for reception via the collocated antenna system or the distributed antenna system based on an inverse of function of coordinates from the geo-location information; and perform a beam sweeping operation based on at least one of: the set of sidelink resources, geo-location information of the V2X device, or the selection of the one or more sidelink resources for the reception.

Another example can include the subject matter of any of the above examples, wherein the processing circuitry is further configured to: generate, or process, multi-band broadcast communications based on a low band and a high band that is greater in frequency than the low band, wherein the multi-band broadcast communications comprise a first sidelink communication on the low band that includes sidelink control information based on the set of sidelink resources to enable a second sidelink communication on the high band.

Another example can include the subject matter of any of the above examples, wherein the sidelink signal comprises a sidelink Demodulation Reference Signal (sidelink DMRS), or a Sidelink Ranging-Reference Signal (SR-RS) that is a Sidelink Ranging Signal (SL-RS), a Sidelink Positioning Reference Signal, a Sidelink Sounding Reference Signal, or a Sidelink Channel State Information (CSI) reference signal.

Another example can include the subject matter of any of the above examples, wherein the processing circuitry is further configured to: generate an SR-RS in one or more sidelink resource pools of the sidelink signal or the sidelink communications by allocating the SR-RS in a last symbol of subframes, respectively, in a sidelink physical channel, wherein the sidelink physical channel comprises at least one of: a Physical Sidelink Control Channel (PSCCH), a Physical Sidelink Shared Channel (PSSCH), or a Physical Sidelink Discovery Channel (PSDCH); generate the SR-RS in dedicated sidelink resources separately from the PSCCH, or the PSSCH, comprising control information for the sidelink ranging; or generate the SR-RS and the control information in a dedicated physical sidelink channel comprising a Physical Sidelink Ranging Channel (PSRCH).

Another example can include the subject matter of any of the above examples, wherein the RF circuitry is further configured to transmit an SR-RS based on an SR-RS transmission bandwidth, wherein the SR-RS transmission bandwidth is equal to at least a part of: a bandwidth of a selected resource for a PSCCH/PSSCH/PSDCH transmission.

Another example can include the subject matter of any of the above examples, wherein the processing circuitry is further configured to: allocate subcarriers of an SR-RS resource pool for an SR-RS transmission based on at least one of: a full bandwidth allocation, an interlaced subcarrier allocation, or a subset of subcarriers that is based on a UE-specific parameter, a UE identity, a Radio Network Temporary Identifier (RNTI), a priority, or a resource associated with a sidelink transmission in a PSCCH or a PSSCH.

Another example can include the subject matter of any of the above examples, wherein the processing circuitry is further configured to: allocate at least a subset of resource elements to an SR-RS transmission based on a numerology comprising a frequency spacing that is different from at least one of: a PSCCH, a PSSCH, or a PSDCH.

Another example can include the subject matter of any of the above examples, wherein the processing circuitry is further configured to: allocate time resources to an SR-RS resource pool for an SR-RS transmission according to a bitmap assigned to the SR-RS resource pool that is repeated based on a predefined period, according to a resource indication of one or more system parameters, or according to a periodical set of sidelink resources that is dynamically configured based on a time offset, a period, or a duration.

Another example can include the subject matter of any of the above examples, wherein the processing circuitry is further configured to: allocate frequency resources to an SR-RS resource pool based on a full system bandwidth, based on a bitmap configuration indicating physical resource blocks (PRBs)/frequency sub-channels assigned to the SR-RS resource pool, or based on a PRB index and a number of PRBs that indicate an SR-RS pool bandwidth.

Another example can include the subject matter of any of the above examples, wherein the processing circuitry derives one or more sidelink resources of the V2X node or the V2X device(s) based on the geo-location information of the V2X node or the V2X device to: assist a beam management procedure between the V2X node and the V2X device through selection of analogue or digital beams at a TX or RX side of the V2X node and the V2X device that is aligned with a line of sigh direction, based on geo-location information of a transmitter or a receiver and an association of sidelink spectrum resources of the geo-location information.

A different example is an apparatus of a Road Side Unit (RSU) in a vehicle communication network, comprising: processing circuitry configured to: generate a sidelink signal to enable a sidelink communication, wherein the sidelink signal comprises a sidelink Demodulation Reference Signal (sidelink DMRS), or a Sidelink Ranging-Reference Signal (SR-RS) that comprises a Sidelink Ranging Signal (SL-RS), a Sidelink Positioning Reference Signal, a Sidelink Sounding Reference Signal, or a Sidelink Channel State Information (CSI) reference signal; determine geo-location information of a vehicle based on the sidelink signal; and determine a distance or a positioning of the vehicle to enable a sidelink ranging and a configuration of a set of sidelink resources based on the geo-location information for sidelink communications associated with the vehicle; a radio frequency (RF) interface, operably coupled to the processing circuitry, configured to receive data for a transmission of the sidelink signal.

Another example can include the subject matter of any of the above examples, further comprising: RF circuitry; wherein the RF circuitry comprises an adaptive antenna array or a directional antenna array configured to transmit, or receive, a broadcast, groupcast or unicast communication of the sidelink signal, and form a directional radiation pattern from a beam sweeping operation based on the geo-location information in a Long Term Evolution (LTE) network or a New Radio (NR) network, wherein the processing circuitry is further configured to apply a beam selection based on the geo-location information to the transmission of the data at a transmitter, a reception of data at a receiver, or at both a transmitter and the receiver.

Another example can include the subject matter of any of the above examples, wherein the sidelink signal comprises the SR-RS, and wherein the processing circuitry is further configured to: generate a selection of the set of sidelink resources for an SR-RS transmission by performing a sensing and a resource selection procedure based on a resource of a separate physical sidelink channel comprising a Physical Sidelink Control Channel (PSCCH), a Physical Sidelink Shared Channel (PSSCH), or a Physical Sidelink Discovery Channel (PSDCH); or generate the selection of the one or more sidelink resources for the SR-RS transmission randomly among a plurality of different sets of SR-RS resources of an SR-RS resource pool.

Another example can include the subject matter of any of the above examples, wherein the sidelink signal comprises the SR-RS, and wherein the processing circuitry is further configured to: generate the selection of the one or more sidelink resources for the SR-RS transmission by a division of geographic zones associated with different sets of the plurality of different sets of SR-RS resources and different geo-location information, respectively, wherein the geo-location information comprises one or more parameters that include at least one of: a phase difference, a time of arrival, a time difference of arrival, a propagation delay, an angle of arrival, a geographic coordinate, a velocity vector, a signal strength, or an antenna system bore sight direction for beam/spectrum management between a V2X device and the V2X node, and wherein the different sets comprise different orthogonal time resources with respect to one another.

Another example can include the subject matter of any of the above examples, wherein the processing circuitry is further configured to: configure an SR-RS resource pool for an SR-RS transmission by allocating subcarriers based on at least one of: a full bandwidth allocation, an interlaced subcarrier allocation, or a subset of subcarriers based on a UE-specific parameter including a UE identity, a Radio Network Temporary Identifier (RNTI), a priority, or a resource for sidelink transmission in a PSCCH or a PSSCH, a time instance of a subframe, a slot or a symbol, a velocity of the geo-location information or an acceleration of the geo-location information.

Another example can include the subject matter of any of the above examples, wherein the processing circuitry is further configured to: configure an SR-RS transmission with a subset of SR-RS resource elements based on a numerology comprising a subcarrier spacing that is an increase in frequency from a resource element of another sidelink channel than for the SR-RS transmission, the another sidelink channel comprising at least one of: a PSCCH, a PSSCH, or a PSDCH, wherein the RF circuitry is configured to transmit the subset of SR-RS resource elements consecutively or at periodic intervals among subcarriers of the SR-RS transmission.

Another example can include the subject matter of any of the above examples, wherein the processing circuitry is further configured to: generate, or process, multi-band broadcast communications based on a low band and a high band that is greater in frequency than the low band, wherein the multi-band broadcast communications comprise a first communication on the low band that includes control data based on the set of sidelink resources to enable a second communication on the high band, or the first communication on the high band that includes the control data based on the set of sidelink resources to enable the second communication on the low band; wherein the control data includes at least one of: a set of radio-layer parameters, the geo-location information, or results of a sensing and resource selection operation.

Another example can include the subject matter of any of the above examples, wherein the processing circuitry is further configured to: indicate sidelink resources selected or allocated for an SR-RS transmission via an explicit signaling or an implicit signaling in the PSCCH, the PSSCH, a Physical Sidelink Ranging Channel (PSRCH) dedicated for an SR-RS as the sidelink signal with a ranging payload for ranging, or the SR-RS, wherein the SR-RS or a separate signal comprises a demodulation reference signal (DRMS) associated with a demodulation of the PSRCH.

A different example also is a computer readable storage medium storing executable instructions that, in response to execution, cause one or more processors of a vehicle-to-everything (V2X) device to support a sidelink communication with a vehicle or a vehicle node, the operations comprising: generate a Sidelink Ranging-Reference Signal (SR-RS) to enable a sidelink communication; determine geo-location information of the vehicle or the vehicle node based on the sidelink signal or a response to the sidelink signal; and determine one or more distances of the vehicle for a sidelink ranging and a set of sidelink resources for the sidelink communication based on the geo-location information.

Another example can include the subject matter of any of the above examples, wherein the operations further comprise: transmitting, or receiving, a broadcast, groupcast or unicast communication of the sidelink signal via an adaptive antenna array or a directional antenna array; and forming a directional radiation pattern from a beam sweeping operation based on the geo-location information in a Long Term Evolution (LTE) network or a New Radio (NR) network.

Another example can include the subject matter of any of the above examples, wherein the operations further comprise: dividing or causing to divide time resources of the set of sidelink resources on orthogonal or sub-orthogonal sets and associating geo zones with different sets of time resources of the time resources; determine a geographical location or a coordinate position of the vehicle or the vehicle node based on the geo-location information; and associate one or more sidelink resources of the set of sidelink resources to sidelink communications with the vehicle or the vehicle node based on a geo-location area that the geographical location is within.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus of a vehicle-to-everything (V2X) device in a vehicle communication network, comprising:
   processing circuitry configured to:
      generate, or process, a sidelink signal of a sidelink communication with a V2X node that comprises a new radio NodeB (gNB), an eNodeB (eNB), a user equipment (UE), a Roadside Unit (RSU), a drone, or other vehicle device;
      determine geo-location information of the V2X node based on the sidelink signal between the V2X device and the V2X node; and
      derive a distance or positioning data of the V2X node based on a sidelink ranging and a set of sidelink resources based on the geo-location information for sidelink communications associated with the V2X node;
   a radio frequency (RF) interface, configured to receive from the processing circuitry, data for a transmission of the sidelink signal.

2. The apparatus of claim 1, further comprising:
   RF circuitry;
   wherein the RF circuitry comprises an adaptive antenna array or a directional antenna array configured to transmit, or receive, a broadcast, groupcast or unicast communication of the sidelink signal with the V2X node to form a directional radiation pattern from a beam sweeping operation based on the geo-location information in a Long Term Evolution (LTE) network or a New Radio (NR) network, wherein the processing circuitry is further configured to apply a beam selection based on the geo-location information to the transmission of the data at a transmitter, a reception of data at a receiver, or at both a transmitter and the receiver.

3. The apparatus of claim 2, wherein the RF circuitry is configured to:
   select the set of sidelink resources for transmission via a collocated antenna array or a distributed antenna array based on the geo-location information;
   derive a selection of one or more sidelink resources for reception via the collocated antenna array or the distributed antenna array based on an inverse of function of coordinates from the geo-location information; and
   perform a beam sweeping operation based on at least one of: the set of sidelink resources, geo-location information of the V2X device, or the selection of the one or more sidelink resources for the reception.

4. The apparatus of claim 2, wherein the RF circuitry is further configured to transmit an SR-RS based on an SR-RS transmission bandwidth, wherein the SR-RS transmission bandwidth is equal to at least a part of: a bandwidth of a selected resource for a PSCCH/PSSCH/PSDCH transmission.

5. The apparatus of claim 1, wherein the processing circuitry is further configured to:
   generate, or process, a synchronous sidelink communication of the sidelink signal that enables a synchronization of the set of sidelink resources for the sidelink communications;
   generate a determination a transmission timing and a frequency between the V2X device and the V2X node or between different V2X nodes based on the synchronous sidelink communication of the sidelink signal; and
   align the sidelink communications based on the transmission timing and the frequency.

6. The apparatus of claim 5, wherein the processing circuitry is further configured to
   determine a synchronization in a time and a frequency to align the sidelink communications and determine symbol boundaries to enable a synchronization operation between the V2X device and the V2X node, or the different V2X nodes, with a timing error within a cyclic prefix (CP) duration of sidelink symbols.

7. The apparatus of claim 1, wherein the processing circuitry is further configured to:
   determine a geographical location or a position of the V2X node based on the geo-location information signaled in sidelink signals or acquired from an external source comprising a Global Network Satellite System (GNSS);
   associate one or more sidelink resources of the set of sidelink resources to the sidelink communications with the V2X node based on a geo-location area that the geographical location is within.

8. The apparatus of claim 7, wherein the processing circuitry is further configured to:
   derive the one or more sidelink resources based on one or more coordinates of the geographical location, or a derivative of the geo-location information comprising a velocity vector;
   wherein the set of sidelink resources comprise at least one of: a time resource index, a time interval, a frequency resource index, a frequency range, a beam index, a coding index, an analog or digital spatial pre-coding (beam/port), a code spreading, a set of user equipment (UE) specific parameters, a set of system parameters, or a set of location parameters.

9. The apparatus of claim 1, wherein the processing circuitry is further configured to:
   generate, or process, multi-band broadcast communications based on a low band and a high band that is greater in frequency than the low band, wherein the multi-band broadcast communications comprise a first sidelink communication on the low band that includes sidelink control information based on the set of sidelink resources to enable a second sidelink communication on the high band.

10. The apparatus of claim 1, wherein the sidelink signal comprises a sidelink Demodulation Reference Signal (sidelink DMRS), or a Sidelink Ranging-Reference Signal (SR-RS) that is a Sidelink Ranging Signal (SL-RS), a Sidelink Positioning Reference Signal, a Sidelink Sounding Reference Signal, or a Sidelink Channel State Information (CSI) reference signal.

11. The apparatus of claim 1, wherein the processing circuitry is further configured to:
   generate an SR-RS in one or more sidelink resource pools of the sidelink signal or the sidelink communications by allocating the SR-RS in a last symbol of subframes, respectively, in a sidelink physical channel, wherein the sidelink physical channel comprises at least one of: a Physical Sidelink Control Channel (PSCCH), a Physical Sidelink Shared Channel (PSSCH), or a Physical Sidelink Discovery Channel (PSDCH);
   generate the SR-RS in dedicated sidelink resources separately from the PSCCH, or the PSSCH, comprising control information for the sidelink ranging; or
   generate the SR-RS and the control information in a dedicated physical sidelink channel comprising a Physical Sidelink Ranging Channel (PSRCH).

12. The apparatus of claim 1, wherein the processing circuitry is further configured to:
   allocate subcarriers of an SR-RS resource pool for an SR-RS transmission based on at least one of: a full bandwidth allocation, an interlaced subcarrier allocation, or a subset of subcarriers that is based on a UE-specific parameter, a UE identity, a Radio Network Temporary Identifier (RNTI), a priority, or a resource associated with a sidelink transmission in a PSCCH or a PSSCH.

13. The apparatus of claim 1, wherein the processing circuitry is further configured to:
   allocate at least a subset of resource elements to an SR-RS transmission based on a numerology comprising a frequency spacing that is different from at least one of: a PSCCH, a PSSCH, or a PSDCH.

14. The apparatus of claim 1, wherein the processing circuitry is further configured to:
   allocate time resources to an SR-RS resource pool for an SR-RS transmission according to a bitmap assigned to the SR-RS resource pool that is repeated based on a predefined period, according to a resource indication of one or more system parameters, or according to a periodical set of sidelink resources that is dynamically configured based on a time offset, a period, or a duration.

15. The apparatus of claim 1, wherein the processing circuitry is further configured to:
   allocate frequency resources to an SR-RS resource pool based on a full system bandwidth, based on a bitmap configuration indicating physical resource blocks (PRBs)/frequency sub-channels assigned to the SR-RS resource pool, or based on a PRB index and a number of PRBs that indicate an SR-RS pool bandwidth.

16. The apparatus of claim 1, wherein the processing circuitry derives one or more sidelink resources of the V2X node or the V2X device(s) based on the geo-location information of the V2X node or the V2X device to:
   assist a beam management procedure between the V2X node and the V2X device through selection of analogue or digital beams at a TX or RX side of the V2X node and the V2X device that is aligned with a line of sigh direction, based on geo-location information of a transmitter or a receiver and an association of sidelink spectrum resources of the geo-location information.

17. An apparatus of a Road Side Unit (RSU) in a vehicle communication network, comprising:
   processing circuitry configured to:
      generate a sidelink signal to enable a sidelink communication, wherein the sidelink signal comprises a sidelink Demodulation Reference Signal (sidelink DMRS), or a Sidelink Ranging-Reference Signal (SR-RS) that comprises a Sidelink Ranging Signal (SL-RS), a Sidelink Positioning Reference Signal, a Sidelink Sounding Reference Signal, or a Sidelink Channel State Information (CSI) reference signal;
      determine geo-location information of a vehicle based on the sidelink signal; and
      determine a distance or a positioning of the vehicle to enable a sidelink ranging and a configuration of a set of sidelink resources based on the geo-location information for sidelink communications associated with the vehicle;
   a radio frequency (RF) interface, operably coupled to the processing circuitry, configured to receive data for a transmission of the sidelink signal.

18. The apparatus of claim 17, further comprising:
   RF circuitry;
   wherein the RF circuitry comprises an adaptive antenna array or a directional antenna array configured to transmit, or receive, a broadcast, groupcast or unicast communication of the sidelink signal, and form a directional radiation pattern from a beam sweeping operation based on the geo-location information in a Long Term Evolution (LTE) network or a New Radio (NR) network, wherein the processing circuitry is further configured to apply a beam selection based on the geo-location information to the transmission of the data at a transmitter, a reception of data at a receiver, or at both a transmitter and the receiver.

19. The apparatus of claim 18, wherein the processing circuitry is further configured to:
   configure an SR-RS resource pool for an SR-RS transmission by allocating subcarriers based on at least one of: a full bandwidth allocation, an interlaced subcarrier allocation, or a subset of subcarriers based on a UE-specific parameter including a UE identity, a Radio Network Temporary Identifier (RNTI), a priority, or a resource for sidelink transmission in a PSCCH or a PSSCH, a time instance of a subframe, a slot or a symbol, a velocity of the geo-location information or an acceleration of the geo-location information.

20. The apparatus of claim 18, wherein the processing circuitry is further configured to:
   configure an SR-RS transmission with a subset of SR-RS resource elements based on a numerology comprising a subcarrier spacing that is an increase in frequency from a resource element of another sidelink channel than for the SR-RS transmission, the another sidelink channel comprising at least one of: a PSCCH, a PSSCH, or a PSDCH, wherein the RF circuitry is configured to transmit the subset of SR-RS resource elements consecutively or at periodic intervals among subcarriers of the SR-RS transmission.

21. The apparatus of claim 17, wherein the sidelink signal comprises the SR-RS, and wherein the processing circuitry is further configured to:
   generate a selection of the set of sidelink resources for an SR-RS transmission by performing a sensing and a resource selection procedure based on a resource of a separate physical sidelink channel comprising a Physical Sidelink Control Channel (PSCCH), a Physical Sidelink Shared Channel (PSSCH), or a Physical Sidelink Discovery Channel (PSDCH); or
   generate the selection of one or more sidelink resources for the SR-RS transmission randomly among a plurality of different sets of SR-RS resources of an SR-RS resource pool.

22. The apparatus of claim 21, wherein the sidelink signal comprises the SR-RS, and wherein the processing circuitry is further configured to:
   generate the selection of the one or more sidelink resources for the SR-RS transmission by a division of geographic zones associated with different sets of the plurality of different sets of SR-RS resources and different geo-location information, respectively, wherein the geo-location information comprises one or more parameters that include at least one of: a phase difference, a time of arrival, a time difference of arrival, a propagation delay, an angle of arrival, a geographic coordinate, a velocity vector, a signal strength, or an antenna system bore sight direction for beam/spectrum management between a V2X device and a V2X node, and wherein the different sets comprise different orthogonal time resources with respect to one another.

23. The apparatus of claim 17, wherein the processing circuitry is further configured to:
   generate, or process, multi-band broadcast communications based on a low band and a high band that is greater in frequency than the low band, wherein the multi-band broadcast communications comprise a first communication on the low band that includes control data based on the set of sidelink resources to enable a second communication on the high band, or the first communication on the high band that includes the control data based on the set of sidelink resources to enable the second communication on the low band;
   wherein the control data includes at least one of: a set of radio-layer parameters, the geo-location information, or results of a sensing and resource selection operation.

24. The apparatus of claim 17, wherein the processing circuitry is further configured to:
   indicate sidelink resources selected or allocated for an SR-RS transmission via an explicit signaling or an implicit signaling in a PSCCH, a PSSCH, a Physical Sidelink Ranging Channel (PSRCH) dedicated for an SR-RS as the sidelink signal with a ranging payload for ranging, or the SR-RS, wherein the SR-RS or a separate signal comprises a demodulation reference signal (DRMS) associated with a demodulation of the PSRCH.

25. A non-transitory computer readable storage medium storing executable instructions that, in response to execution, cause one or more processors of a vehicle-to-everything (V2X) device to support a sidelink communication with a vehicle or a vehicle node with operations, the operations comprising:

generating a Sidelink Ranging-Reference Signal (SR-RS) to enable a sidelink communication;

determining geo-location information of the vehicle or the vehicle node based on a sidelink signal or a response to the sidelink signal; and determining one or more distances of the vehicle for a sidelink ranging and a set of sidelink resources for the sidelink communication based on the geo-location information.

26. The non-transitory computer readable storage medium of claim 25, wherein the operations further comprise:

transmitting, or receiving, a broadcast, groupcast or unicast communication of the sidelink signal via an adaptive antenna array or a directional antenna array; and forming a directional radiation pattern from a beam sweeping operation based on the geo-location information in a Long Term Evolution (LTE) network or a New Radio (NR) network.

27. The non-transitory computer readable storage medium of claim 25, wherein the operations further comprise:

dividing or causing to divide time resources of the set of sidelink resources on orthogonal or sub-orthogonal sets and associating geo zones with different sets of time resources of the time resources;

determining a geographical location or a coordinate position of the vehicle or the vehicle node based on the geo-location information; and associating one or more sidelink resources of the set of sidelink resources to sidelink communications with the vehicle or the vehicle node based on a geo-location area that the geographical location is within.

\* \* \* \* \*